(12) United States Patent
Oami

(10) Patent No.: US 6,782,050 B2
(45) Date of Patent: Aug. 24, 2004

(54) MOVING IMAGE ENCODING DEVICE

(75) Inventor: Ryoma Oami, Tokyo (JP)

(73) Assignee: NEC Corporation, Tokyo (JP)

( * ) Notice: Subject to any disclaimer, the term of this patent is extended or adjusted under 35 U.S.C. 154(b) by 412 days.

(21) Appl. No.: 09/986,045

(22) Filed: Nov. 7, 2001

(65) Prior Publication Data

US 2002/0080876 A1 Jun. 27, 2002

(30) Foreign Application Priority Data

Nov. 8, 2000 (JP) ........................................ 2000-340625

(51) Int. Cl.[7] .............................. H04B 1/66; H04N 7/12
(52) U.S. Cl. .................................................. 375/240.03
(58) Field of Search ........................ 375/240.01, 240.03, 375/240.04, 240.05, 240.06, 240.07, 240.08, 240.24, 240.27; 348/409.1, 408.1, 415.1; 382/232, 234, 236; H04B 1/66, 7/12

(56) References Cited

U.S. PATENT DOCUMENTS 5,073,820 A * 12/1991 Nakagawa et al. .... 375/240.03
6,195,388 B1 * 2/2001 Choi et al. ............. 375/240.05

FOREIGN PATENT DOCUMENTS

JP           11-225329 A        8/1999

* cited by examiner

Primary Examiner—Tung T. Vo
(74) Attorney, Agent, or Firm—Foley & Lardner LLP

(57) ABSTRACT

In a moving image encoding device, a first object encoding section encodes first object data within a unit time allowable code amount and outputs the resultant data and a first object generated code amount. A code amount log storage section stores the first object generated code amount. A remaining object allowable code amount calculating section adds up the first object generated code amount within each time interval to obtain a sum, and subtracts the sum from the unit time allowable code amount to calculate a remaining object unit time allowable code amount. A second object encoding section encodes each VOP of second object data in accordance with a second object VOP target code amount, and outputs the resultant data, second object encoding information including quantization information, motion information, activity information, encoding error information, or object size information, and a second object generated code amount. A second object VOP target code amount determining section distributes the remaining object unit time allowable code amount to each VOP whose generation time is included in a time interval on the time axis, and calculates the second object VOP target code amount that is a target value in encoding each VOP of the second object. A recording medium is also disclosed.

12 Claims, 10 Drawing Sheets

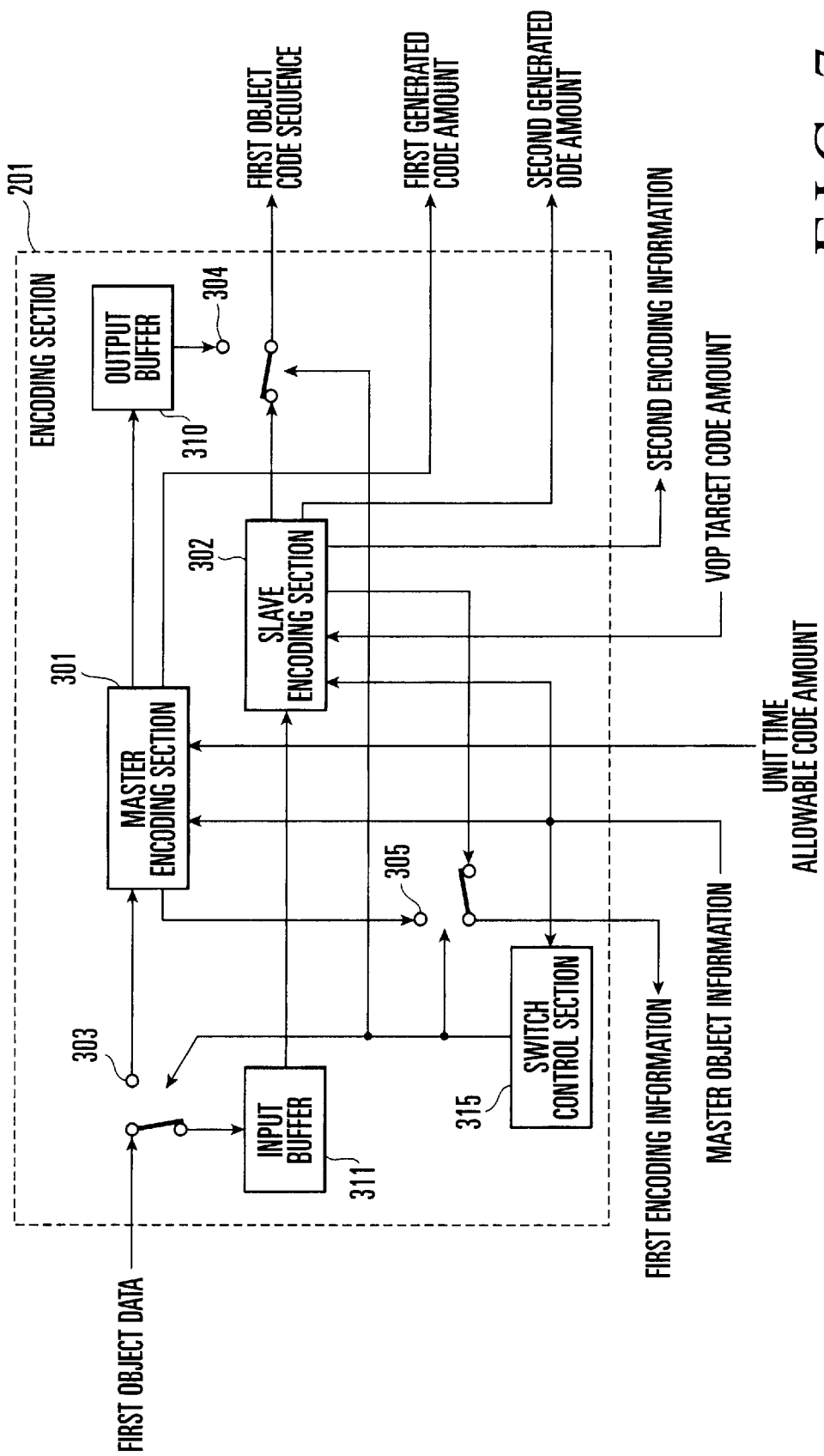
F I G. 7

MOVING IMAGE ENCODING DEVICE

BACKGROUND OF THE INVENTION

The present invention relates to a moving image encoding device and, more particularly, to an improvement in code amount control in a moving image encoding device for encoding a plurality of objects.

A conventional moving image encoding device of this type is used to perform control to encode a moving image constituted by a plurality of objects within a predetermined code amount, as disclosed in, for example, Japanese Patent Laid-Open No. 11-225329 (reference 1).

FIG. 11 shows a conventional moving image encoding device for encoding a moving image constituted by a plurality of objects.

The first object data is input to an encoding section 1000. The first output of the encoding section 1000 outputs the first object code sequence, and the second output (first object generated code amount) is connected to a subtracting section 1003. The second object data and an output from the subtracting section 1003 are input to an encoding section 1001. The first output of the encoding section 1001 outputs the second object code sequence, and the second output (second object generated code amount) and third output (second object encoding information) are connected to a total VOP (Video Object Plane) target code amount determining section 1002. A unit time allowable code amount and the second and third outputs from the encoding section 1001 are input to the total VOP target code amount determining section 1002. The output (total VOP target code amount) of the total VOP target code amount determining section 1002 is connected to the subtracting section 1003. The output from the total VOP target code amount determining section 1002 and the second output from the encoding section 1000 are input to the subtracting section 1003. The output (second object VOP target code amount) of the subtracting section 1003 is connected to the encoding section 1001.

The operation of the encoding device in FIG. 11 will be described next.

The first object data is encoded by the encoding section 1000, and encoding is performed for each VOP. The first object code sequence as the encoding result is output. The code amount of each VOP generated upon this encoding is output as the first object generated code amount.

The total VOP target code amount determining section 1002 calculates a total VOP target code amount which is the target code amount required to encode all the VOPs on the basis of the encoding information and generated code amount which were obtained by the encoding section 1001 upon encoding of VOPs in the past and an externally supplied allowable code amount. The allowable code amount is a code amount for defining the upper limit of the total code amount of all the objects, e.g., a band or the capacity of data that can be recorded on a recording medium. Encoding information may be the average value of quantization steps.

A total VOP target code amount is a target value for the sum total of code amounts generated upon encoding of the VOPs of each object. As a method of determining a total VOP target code amount, for example, TM-5 (Test Model 5) of MPEG-2 (Moving Picture Experts Group 2) may be used. In this case, after an index representing the degree of complexity with respect to each of picture types, i.e., I, P, and B, from a past generated code amount and the average value of quantization steps, code amounts that can be assigned to GOVs (Groups of VOPs) are distributed in accordance with the obtained degrees of complexity, thereby calculating each VOP target code amount.

The total VOP target code amount output from the total VOP target code amount determining section 1002 is input to the subtracting section 1003. The subtracting section 1003 calculates a second object VOP target code amount as a target code amount required to encode the VOPs of the second object by subtracting the first object generated code amount which is a code amount spent to encode VOPs corresponding to the first object from the code amount output from the total VOP target code amount determining section 1002.

The second object VOP target code amount is input to the encoding section 1001. The encoding section 1001 encodes each VOP of the second object so as to match the second object VOP target code amount output from the subtracting section 1003, thereby creating the second object code sequence. In addition, the encoding section 1001 outputs the second object generated code amount representing the amount of codes actually generated upon encoding and encoding information to the total VOP target code amount determining section 1002.

Reference 1 discloses a device in which background image update information is treated as the first object, and an encoding section performs still image encoding such as JPEG. According to the device disclosed in reference 1, first of all, a background image is encoded as a still image and transmitted or stored, and then, a foreground object and the background update information are encoded and transmitted or stored. That is, the background image update information is encoded into a still image by the encoding section 1000, and the foreground object is encoded with the value obtained by subtracting the code amount generated upon this encoding from the total VOP target code amount. In this case, it is assumed that the code amount generated upon encoding of the background update information is sufficiently smaller than the total VOP target code amount.

However, the following problems arise in the above conventional moving image encoding device.

First, a target value for encoding of each VOP of the second object is determined by setting the VOP target code amount obtained by encoding control on the second object as a target value of a code amount assigned to all VOPs and subtracting the code amount actually generated upon encoding of the first object from the target value.

As the code amount required for encoding of the first object increases, the code amount assigned to the second object decreases, resulting in a considerable deterioration in decoded image quality. If the first object generated code amount is larger than the total VOP target code amount calculated by the total VOP target code amount determining section 1002, in particular, the second object VOP target code amount becomes a negative value. As a consequence, the VOPs of the second object cannot be encoded.

Second, the relationship between the first and second objects cannot be reversed.

Even if the roles of the first and second objects are preferably reversed during a moving image sequence, the conventional encoding section cannot reverse the relationship. The above encoding device encodes the VOPs of the first object first, and then encodes the second object with the remaining code amount. That is, the first and second objects can be regarded as master and slave objects, respectively. This relationship is fixed. For this reason, even if the master/slave relationship between background data and foreground data in encoding is preferably reversed as in a case wherein the size of a foreground object abruptly decreases, this relationship cannot be dynamically changed.

SUMMARY OF THE INVENTION

It is an object of the present invention to provide a moving image encoding device which can keep the image quality of an overall decoded image high, even if the generated code amount of a VOP of a main object temporarily increases, by reducing the influence of this increase on encoding of the remaining objects.

It is another object of the present invention to provide a moving image encoding device which can dynamically change the master/slave relationship between objects in encoding.

In order to achieve the above objects, according to the present invention, there is provided a moving image encoding device for encoding a plurality of objects, comprising first object encoding means for encoding input first object data within a unit time allowable code amount representing an allowable code amount in a unit time to create and output a first object code sequence, and outputting a first object generated code amount, code amount log storage means for storing the first object generated code amount, remaining object allowable code amount calculating means for adding up the first object generated code amount output from the code amount log storage means within each time interval with the unit time length to obtain a sum value, and subtracting the sum value from the unit time allowable code amount, thereby calculating a remaining object unit time allowable code amount, second object encoding means for encoding each VOP (Video Object Plane) of second object data by performing encoding control in accordance with an input second object VOP target code amount to create and output a second object code sequence, and outputting second object encoding information including at least one of quantization information, motion information, activity information, encoding error information, and object size information, and outputting a second object generated code amount, and second object VOP target code amount determining means for distributing the remaining object unit time allowable code amount to each VOP whose generation time is included in a time interval with the unit time length on the basis of the second object encoding information and the second object generated code amount, and calculating the second object VOP target code amount that is a target value of a code amount in encoding each VOP of the second object.

BRIEF DESCRIPTION OF THE DRAWINGS

FIG. 7 is a block diagram showing a moving image encoding section according to the fifth embodiment of the present invention;

DESCRIPTION OF THE PREFERRED EMBODIMENTS

The present invention will be described in detail below with reference to the accompanying drawings.

Figure 1:
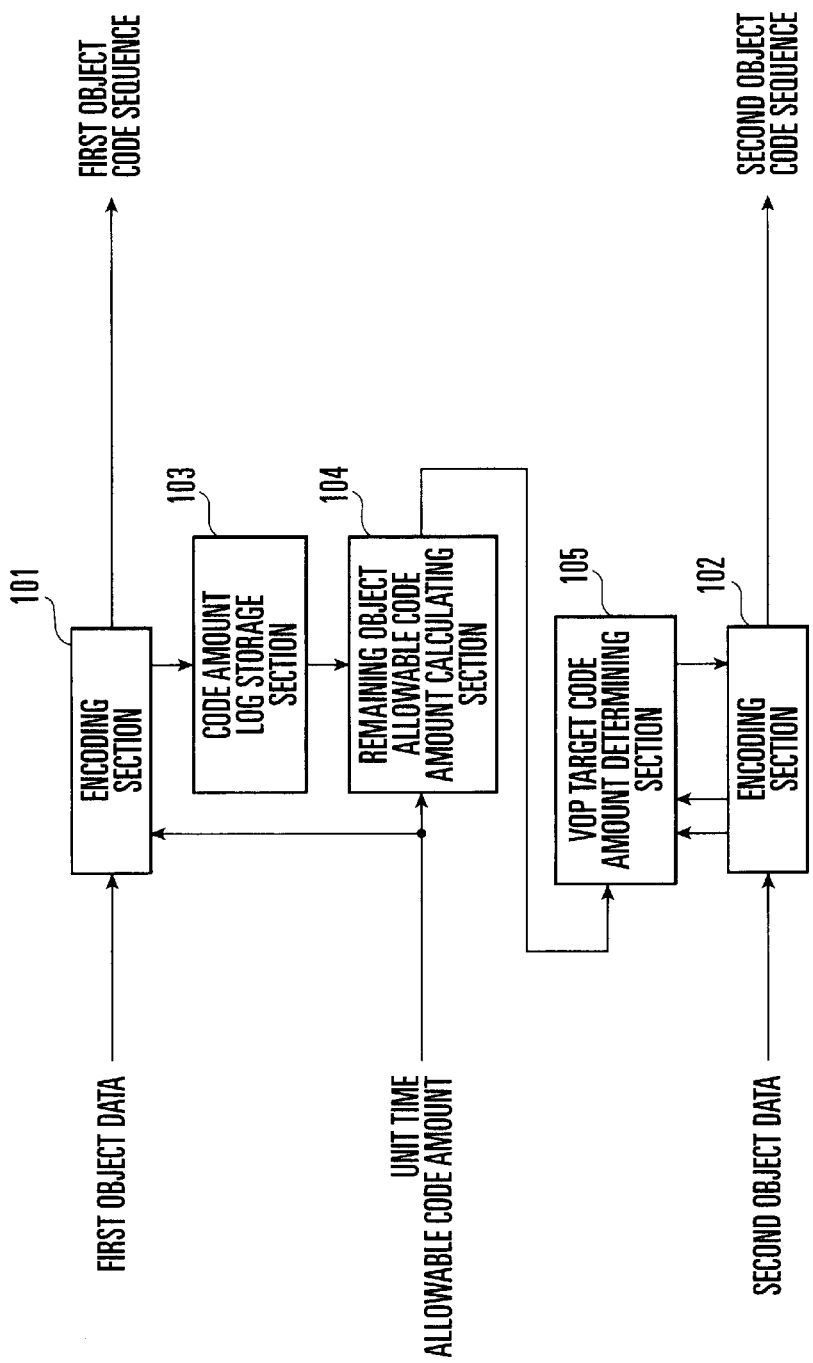
FIG. 1 is a block diagram showing a moving image encoding device according to the first embodiment of the present invention.

FIG. 1 shows a moving image encoding device according to an embodiment of the present invention. First object data and a unit time allowable code amount are input to an encoding section 101. The first output (code sequence) of the encoding section 101 outputs the first object code sequence, and the second output (generated code amount) is connected to a code amount log storage section 103. The output (generated code amount) of the code amount log storage section 103 is connected to a remaining object allowable code amount calculating section 104. The unit time allowable code amount and the output from the code amount log storage section 103 are input to the remaining object allowable code amount calculating section 104. The output (remaining object unit time allowable code amount) of the remaining object allowable code amount calculating section 104 is connected to a VOP target code amount determining section 105.

The second object data and the output of the VOP target code amount determining section 105 are input to an encoding section 102. The first output (code sequence) of the encoding section 102 outputs the second object code sequence, and the second output (generated code amount) and third output (encoding information) are connected to the VOP target code amount determining section 105. The output from the remaining object allowable code amount calculating section 104 and the second and third outputs from the encoding section 102 are input to the VOP target code amount determining section 105. The output (VOP target code amount) of the VOP target code amount determining section 105 is connected to the encoding section 102.

The operation of the encoding device having the above arrangement will be described next.

The first object data is a sequence of the VOPs of the first object and input to the encoding section 101. In this case, a VOP represents a frame of an image object having shape information. Obviously, in the case of an interlaced image, a VOP may be formed for each field. Shape information is data representing whether each pixel is included in an object. In the case of a rectangular shape with the same size as the frame size, no shape information may be included. Shape information may not be binary information but may be a value representing the mixing ratio of pixel values in an object.

The encoding section 101 encodes the first object data to create a code sequence, and outputs it as the first object code sequence. The encoding section 101 also outputs the code amount (generated code amount) generated upon encoding. As this encoding device, for example, an MPEG-4 device can be used. Limitations imposed on encoding of the first object are fewer than those imposed on remaining objects (the second object in FIG. 1). Basically, the first object can be encoded in any form within the range in which the code amount per unit time does not exceed an input unit time allowable code amount.

In this case, a unit time is a period of time on which code amount control is based. First of all, a code amount is assigned per unit time, the assigned code amount is further divided to perform encoding control. A unit time allowable code amount represents the total amount of codes that can be assigned to the VOPs included in a unit time. As a unit time, for example, a period of time corresponding to a GOV (Group of VOPs) may be set. When one GOV is to be constituted by N VOPs in encoding an object whose VOP rate is n VOPs per sec, N/n sec in which one GOV is included is a unit time. If an object is encoded by r bps, the unit time allowable code amount is Nr/n bits.

In this manner, of the objects constituting a frame, an important object is preferentially encoded as the first object. For example, the first object is encoded with a fixed quantization width and importance being attached to image quality, whereas remaining objects are encoded with the remaining code amount that can be assigned. This makes it possible to encode objects without degrading the image quality of an important object.

The generated code amount of the first object output from the encoding section 101 is input to the code amount log storage section 103 and temporarily stored. Thereafter, this information is input to the remaining object allowable code amount calculating section 104. The remaining object allowable code amount calculating section 104 reads out, from the code amount log storage section 103, the code amount generated upon encoding of each VOP of the first object included in the unit time, and totalizes the code amounts to calculate the sum of the code amounts generated upon encoding of the first object in the unit time. The remaining object allowable code amount calculating section 104 then subtracts the calculated sum of code amounts from the unit time allowable code amount input from the other input to calculate a code amount that can be used to encode objects other than the first object, and outputs it as an remaining object unit time allowable code amount.

The second object data is a sequence of VOPs of the second object and input to the encoding section 102. The encoding section 102 creates a code sequence by encoding the second object data, and outputs it as the second object code sequence. The encoding section 102 also outputs the code amount generated upon encoding as a generated code amount, and outputs quantization information, motion information, activity information, encoding error information, or the like as encoding information. In encoding the second object, encoding control is performed such that the generated code amount of each VOP becomes equal to the VOP target code amount output from the VOP target code amount determining section 105. As this encoding device, an MPEG-4 device can also be used.

The VOP target code amount determining section 105 determines a VOP target code amount as a code amount that can be used for encoding of each VOP of the second object on the basis of the remaining object unit time allowable code amount output from the remaining object allowable code amount calculating section 104 and the encoding information and generated code amount output from the encoding section 102, and outputs it to the encoding section 102. As a method of determining this code amount, for example, TM-5 of MPEG-2 can be used. In this case, the code amount information output from the encoding section 102 includes quantization step information. A complexity index obtained as the product of this average value and generated code amount is obtained for each picture type, and code amounts are distributed in accordance with this complexity index and the number of VOPs to be encoded within a GOV, thereby determining a target code amount of each VOP of the second object. Alternatively, a code amount control method like VM (Verification Model) of MPEG-4 may be used.

Code amount assignment in the above encoding operation in a case wherein a period of time corresponding to a GOV is set as a unit time will be described in detail next.

Let N1 be the number of VOPs in a GOV of the first object data, and N2 be the number of VOPs in a GOV of the second object data. In this case, N1 and N2 may be equal to each other or different from each other. Note that the unit time is common to all objects. Let $b1(i)$ ($i=0, \ldots, N1-1$) be the generated code amount of each VOP of the first object, and $b2(j)$ ($j=0, \ldots, N2-1$) be the generated code amount of each VOP of the second object. In this case, the total generated code amount (R1) for all the GOVs of the first object is given by $$R_1 = \sum_{i=0}^{N_1-1} b_1(i)$$

Therefore, letting R be the unit time allowable code amount, the remaining object unit time allowable code amount (R2) is given by $$R_2 = R - R_1$$

In the case shown in FIG. 1, since the number of objects to be encoded is two, the remaining object unit time allowable code amount is the allowable code amount of the second object.

The second object is encoded by assigning the code amount R2 to each of the N2 VOPs included in each GOV. When encoding of the first J (=1, 2, . . . , N2−1) VOPs is completed, the total code amount that can be assigned to the remaining VOPs is given by $$R_2 - \sum_{j=0}^{J-1} b_2(j)$$

In encoding the N2−J remaining VOPs, this code amount is distributed to determine a VOP target code amount. This operation is repeated for J=1, 2, . . . , N2−1 to calculate a code amount of each VOP.

In the above encoding operation, when encoding of the first object included in the unit time is completed, the code amount used for encoding of the first object within this unit time is calculated, and the calculated code amount is subtracted from the unit time allowable code amount to determine a code amount that can be assigned in encoding of the second object in the unit time.

The relationship between encoding of the first object and encoding of the second object on the time axis will be described next with reference to FIG. 2. In this case as well, the unit time corresponds to one GOV. However, the present invention is not limited to this.

Figure 2:
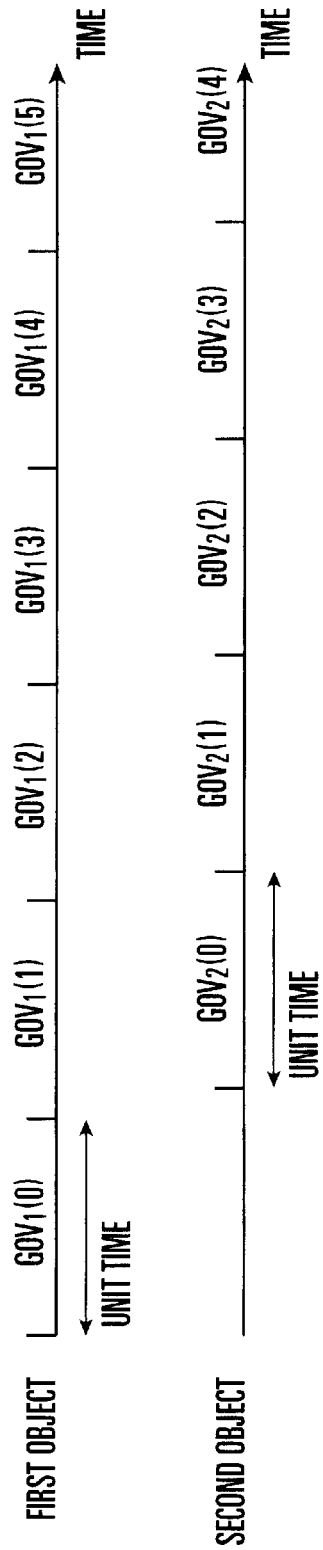
FIG. 2 is a view showing the relationship between objects on the time axis which are encoded by the two encoding sections shown in FIG. 1.

FIG. 2 shows the relationship between the time of encoding of the first object data and the time of encoding of the second object data. Referring to FIG. 2, the GOV sequences of the first and second objects are respectively represented by GOV1(i) and GOV2(i) (i=0, 1, 2, ...) As is obvious from FIG. 2, the second object is encoded with a delay equal to or more than the unit time with respect to the first object. For this reason, when synchronization need be established between the objects in sending them out to a transmission path, a buffer is prepared to temporarily store the first object code sequence so as to establish synchronization.

Consider next generated code amounts. Letting $R1(m)$ and $R2(m)$ be the generated code amounts for the first and second objects at the mth GOV, a generated code amount per GOV of each object is given as indicated by Table 1. Although the second object is encoded with a delay, the sum total of generated code amounts between objects accurately coincides with the unit time allowable code amount of each GOV.

According to the first embodiment, even if the generated code amount of the first object increases at a specific VOP, the influence of this increase on encoding of the second object can be evenly dispersed within a unit time. This makes it possible to suppress extreme variations in the code amount of the second object and improve the quality of the image obtained by decoding the first and second objects and synthesizing them.

The second embodiment of the present invention will be described next. The first embodiment has exemplified the case wherein a unit time delay is permitted in encoding. In the second embodiment, an encoding method in a case wherein no delay is permitted will be described.

The arrangement of each encoding section is the same as in FIG. 1, and the operation of each section is basically the same as in FIG. 1. Note, however, that there is no time difference between the first and second objects when they are input. In this case, encoding control is not performed for a GOV at the same timing as that of the first object but is performed for a GOV with a delay by using the remaining object unit time allowable code amount output from an remaining object allowable code amount calculating section 104. That is, GOV2(i+k) (k>0) is encoded by using the remaining object unit time allowable code amount obtained as a result of encoding of GOV1(i).

More specifically, in the first embodiment, although a delay is permitted, the following relationship holds:

$$R=R_1(m)+R_2(m)$$

TABLE 1

| GOV No. | 0 | 1 | 2 | 3 | 4 | 5 | ... |
|---|---|---|---|---|---|---|---|
| First Object Generated Code Amount | $R_1(0)$ | $R_1(1)$ | $R_1(2)$ | $R_1(3)$ | $R_1(4)$ | $R_1(5)$ | ... |
| Second Object Generated Code Amount | $R-R_1(0)$ | $R-R_1(1)$ | $R-R_1(2)$ | $R-R_1(3)$ | $R-R_1(4)$ | $R-R_1(5)$ | ... |

The encoding sections for encoding two objects have been described above with reference to FIG. 1. This arrangement can be extended to encode three or more objects. In this case, an allowable code amount distributing section for distributing remaining object unit time allowable code amounts to a plurality of objects may be connected to the output of the remaining object allowable code amount calculating section 104. In addition, a section equivalent to the VOP target code amount determining section 105 in FIG. 1 and a section equivalent to the encoding section 102 are prepared for each object other than the first object, and the result distributed by the allowable code amount distributing section may be sent out to the VOP target code amount determining section for each object.

An example of the method of distributing remaining object unit time allowable code amounts in the allowable code amount distributing section is a method of obtaining an area from the shape information of each object and proportionally distributing code amounts in accordance with the ratio of areas. If, however, shape information is not binary information, the information is binarized first, and then an area is obtained. Other methods include a method of assigning weights in consideration of the importance of each object, a method of calculating an index representing the degree of attention focused on each object by using the motion information or activity information of the object and performing proportional distribution on the basis of the calculated indexes.

In contrast to this, in the second embodiment, control is performed to hold:

$$R=R_1(m)+R_2(m+k)$$

In this case, however, for the first k GOVS, the generated code amount of the second object is not determined. For this reason, encoding is performed with a predetermined code amount during this interval.

Figure 3:
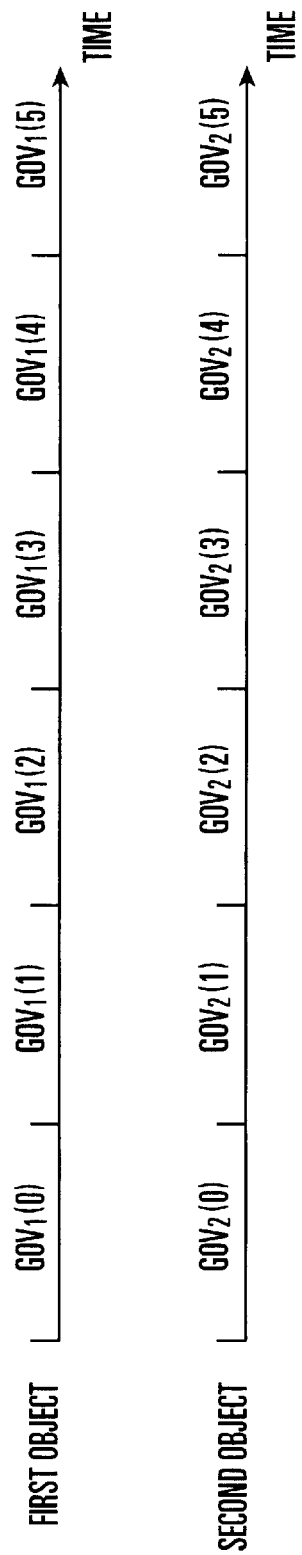
FIG. 3 is a view showing the relationship between objects on the time axis which are encoded by two encoding sections in a moving image encoding device according to the second embodiment of the present invention.

FIG. 3 shows the relationship between encoding of the first object and encoding of the second object on the time axis. As shown in FIG. 3, there is no time difference between encoding of the first object and encoding of the second object.

The generated code amounts are shown in Table 2. Table 2 shows, for example, the generated code amounts at the respective GOVs when k=1. In encoding control for the first GOV of the second object, a predetermined value R0 is used. As is obvious from Table 2, the sum of code amounts for each GOV between the objects varies. If, however, these code amounts are averaged in a longer period of time, the resultant value basically falls within the allowable code amount. These variations can be absorbed by preparing a buffer for storing code sequences, temporarily storing code sequences in the buffer, and sending out the code sequences to a transmission path while adjusting the timing.

TABLE 2

| GOV No. | 0 | 1 | 2 | 3 | 4 | 5 | ... |
|---|---|---|---|---|---|---|---|
| First Object Generated Code Amount | $R_1(0)$ | $R_1(1)$ | $R_1(2)$ | $R_1(3)$ | $R_1(4)$ | $R_1(5)$ | ... |
| Second Object Generated Code Amount | $R_0$ | $R-R_1(0)$ | $R-R_1(1)$ | $R-R_1(2)$ | $R-R_1(3)$ | $R-R_1(4)$ | ... |

According to the second embodiment, although sum totals of code amounts vary between the objects from the viewpoint of the GOV unit, encoding can be performed without causing much delay. In this case as well, encoding sections for three or more objects can be formed in the same manner as in the first embodiment.

The third embodiment of the present invention will be described next.

Figure 4:
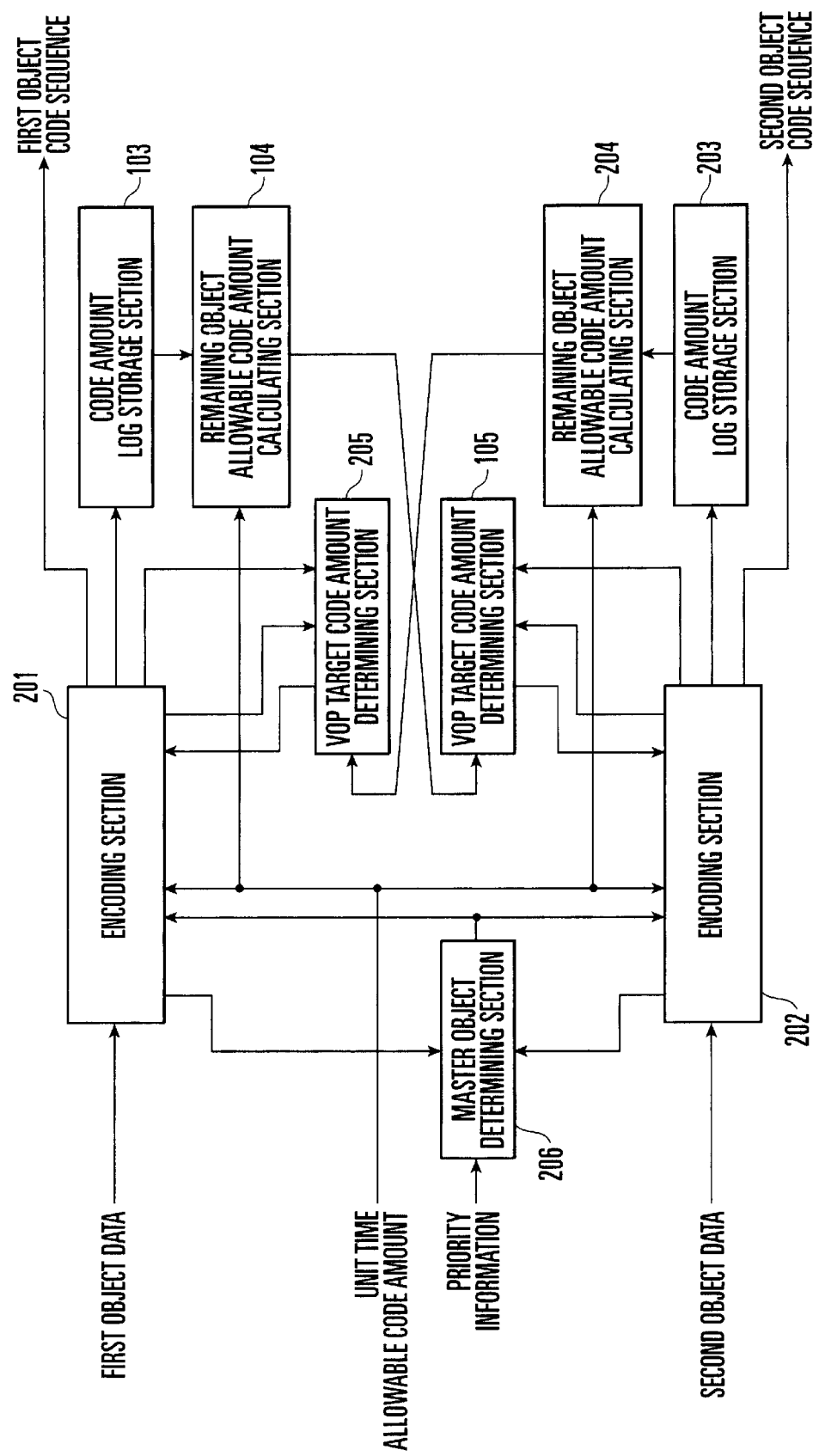
FIG. 4 is a block diagram showing a moving image encoding device according to the third embodiment of the present invention.

FIG. 4 shows a moving image encoding device according to the third embodiment of the present invention. Referring to FIG. 4, an encoding section 201 receives the first object data, a unit time allowable code amount, an output from a master object determining section 206, and an output from a VOP target code amount determining section 205. The first output (code sequence) of the encoding section 201 outputs the first object code sequence, and the second output (first generated code amount) is connected to a code amount log storage section 103. The third output (first encoding information) of the encoding section 201 is connected to the master object determining section 206, and the fourth output (second generated code amount) and fifth output (second encoding information) are connected to the VOP target code amount determining section 205.

The second output from the encoding section 201 is input to the code amount log storage section 103. The output (generated code amount) of the code amount log storage section 103 is connected to an remaining object allowable code amount calculating section 104. The unit time allowable code amount and an output from the code amount log storage section 103 are input to the remaining object allowable code amount calculating section 104. The output (remaining object unit time allowable code amount) of the remaining object allowable code amount calculating section 104 is connected to a VOP target code amount determining section 105.

An encoding section 202 receives the second object data, a unit time allowable code amount, an output from the master object determining section 206, and an output from the VOP target code amount determining section 105. The first output (code sequence) of the encoding section 202 outputs the second object code sequence, and the second output (first generated code amount) is connected to a code amount log storage section 203. The third output (first encoding information) of the encoding section 202 is connected to the master object determining section 206, and the fourth output (second generated code amount) and fifth output (second encoding information) are connected to the VOP target code amount determining section 105.

The VOP target code amount determining section 105 receives an output from the remaining object allowable code amount calculating section 104 and the fourth and fifth outputs from the encoding section 202. The output (VOP target code amount) of the VOP target code amount determining section 105 is connected to the encoding section 202. The second output of the encoding section 202 is input to the code amount log storage section 203. The output (generated code amount) of the code amount log storage section 203 is connected to an remaining object allowable code amount calculating section 204. A unit time allowable code amount and an output from the code amount log storage section 203 are input to the remaining object allowable code amount calculating section 204. The output (remaining object unit time allowable code amount) of the remaining object allowable code amount calculating section 204 is connected to the VOP target code amount determining section 205.

The VOP target code amount determining section 205 receives an output from the remaining object allowable code amount calculating section 204 and the fourth and fifth outputs from the encoding section 201. The output (VOP target code amount) of the VOP target code amount determining section 205 is connected to the encoding section 201. The master object determining section 206 receives priority information, the third output from the encoding section 201, and the third output from the encoding section 202. The output (master object information) of the master object determining section 206 is connected to the encoding section 201 and encoding section 202.

The operation of the encoding device having the above arrangement will be described next.

First of all, priority information indicating the priority level between objects is input to the master object determining section 206. On the basis of the input information, the master object determining section 206 then outputs master object information indicating which one of the first and second objects becomes a master object.

After the encoding sections 201 and 202 start encoding, the first encoding information output from the encoding section 201 and the first encoding information output from the encoding section 202 are input to the master object determining section 206 to be used to determine a master object. In this case, encoding information includes the size information of each object, motion information, activity information, quantization information, encoding error information, and the like. At least one of these pieces of information is contained in this encoding information. However, a master object can also be determined by using only externally input priority information. In this case, the pieces of first encoding information output from the encoding section 201 and encoding section 202 need not be input to the master object determining section 206.

Examples of the method of determining a master object includes a method of determining a master object in accordance with the size of each object, a method of determining a master object in consideration of the size and importance of each object, and a method of determining a master object on the basis of an index representing the degree of attention focused on each object, calculated by using the motion information or activity information of each object.

The pieces of first encoding information output from the encoding sections 201 and 202 may differ in timing, and hence the master object determining section 206 incorporates a storage section for temporarily storing them. In determining a master object, the pieces of first encoding information corresponding to VOPs at the same time are used.

The operation of each encoding section in FIG. 4 changes depending on the master object information output from the master object determining section. First, operation in a steady state in a case wherein the first object is a master object will be described. Second, operation in a steady state in a case wherein the first object is not a master object will be described. Finally, operation in a case wherein master object information changes will be described.

Operation in a steady state in a case wherein the first object is a master object will be described first. In this case, the operation of the encoding device in FIG. 4 is almost the same as that of the encoding device in FIG. 1. The encoding section 201 encodes the first object in accordance with a unit time allowable code amount without using the VOP target code amount output from the VOP target code amount determining section 205. The encoding section 201 then outputs the resultant code sequence as the first object code sequence, and outputs a generated code amount as the first generated code amount to the code amount log storage section 103. The encoding section 201 also outputs encoding information as the first encoding information to the master object determining section 206. The encoding section 201 does not output the second generated code amount and second encoding information. Note that such operation of the encoding section will be simply referred to as master operation.

The operations of the code amount log storage section 103, remaining object allowable code amount calculating section 104, and VOP target code amount determining section 105 are the same as those of the corresponding sections of the encoding device in FIG. 1.

The encoding section 202 encodes each VOP in accordance with the VOP target code amount output from the VOP target code amount determining section 105 without using the unit time allowable code amount. The encoding section 202 then outputs the resultant code sequence as the second object code sequence, and outputs encoding information and a generated code amount as the second encoding information and second generated code amount to the VOP target code amount determining section 105. In addition, the encoding section 202 outputs encoding information as the second encoding information to the master object determining section 206. The first encoding information and second encoding information need not be identical to each other but may be identical to each other. The encoding section 202 does not output the first generated code amount. Note that such operation of the encoding section will be simply referred to as slave operation.

The remaining sections, i.e., the code amount log storage section 203, remaining object allowable code amount calculating section 204, and VOP target code amount determining section 205, do not operate.

Operation in a steady state in a case wherein the first object is not a master object will be described next. In this case, the encoding device in FIG. 4 operates such that the roles of the first and second objects are interchanged. More specifically, the encoding section 202 operates in the same manner as the encoding section 201 when the first object is a master object, creates a code sequence by encoding the second object, and outputs it as the second object code sequence. At the same time, the generated code amount is output as the first generated code amount to the code amount log storage section 203. In addition, the encoding information is output as the first encoding information to the master object determining section 206.

The code amount log storage section 203 operates in the same manner as the code amount log storage section 103 when the first object is a master object, and temporarily stores the first generated code amount output from the encoding section 202. The remaining object allowable code amount calculating section 204 operates in the same manner as the remaining object allowable code amount calculating section 104 when the first object is a master object, reads out, from the code amount log storage section 203, the code amount generated upon encoding of each VOP of the second object included in the unit time, and totalizes the code amounts. The remaining object allowable code amount calculating section 204 then calculates a remaining object unit time allowable code amount by subtracting the resultant sum from the unit time allowable code amount, and outputs it to the VOP target code amount determining section 205.

The VOP target code amount determining section 205 operates in the same manner as the VOP target code amount determining section 105 when the first object is a master object, calculates a VOP target code amount from the first remaining object unit time allowable code amount output from the remaining object allowable code amount calculating section 204 and the second encoding information and second generated code amount output from the encoding section 201, and outputs the calculated code amount to the encoding section 201.

The encoding section 201 operates in the same manner as the encoding section 202 when the first object is a master object, encodes the first object in accordance with the VOP target code amount output from the VOP target code amount determining section 205 to create a code sequence, and outputs it as the first object code sequence. At the same time, the encoding section 201 outputs encoding information as the first encoding information to the master object determining section 206, and outputs a generated code amount and encoding information as the second generated code amount and second encoding information to the VOP target code amount determining section 205.

The remaining sections, i.e., the code amount log storage section 103, remaining object allowable code amount calculating section 104, and VOP target code amount determining section 105 do not operate.

Operation in a case wherein master object information changes will be described next. Assume that parallel execution or the like of encoding is not performed from the viewpoint of an object unit, and object data to be encoded within a unit time is data corresponding to the unit time.

An object other than a master object is encoded with a delay equal to or more than the unit time. For this reason, the encoding section that has encoded a master object stops encoding until encoding of objects other than the master object reaches a master object switching time point. When encoding of the objects other than the master object reaches the master object switching time point, one of the objects becomes a master object in accordance with the master object information output from the master object determining section 206. The encoding section for the object that has become a master object performs encoding for the unit time. The encoding section for the other object stops during this period. Thereafter, encoding of the other object is resumed with a delay corresponding to the unit time.

Figure 5:
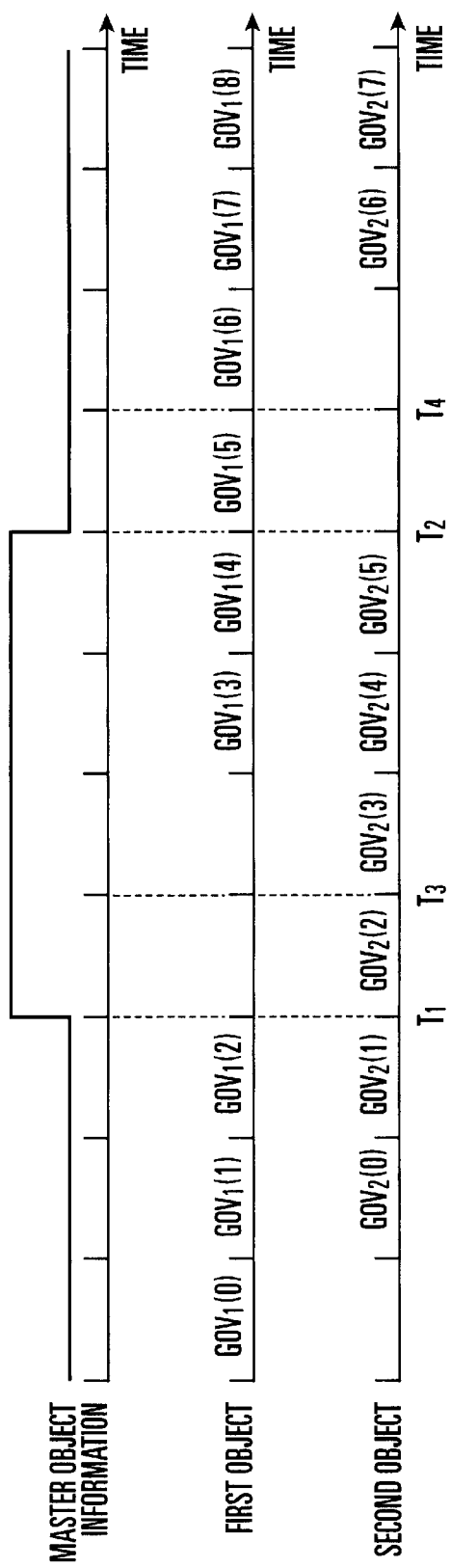
FIG. 5 is a view showing the relationship between the signal output from a master object determining section and objects encoded by two encoding sections on the time axis in the moving image encoding device shown in FIG. 4.

FIG. 5 shows the relationship between the master object information described above and the GOVs encoded by the encoding sections 201 and 202 on the time axis. Referring to FIG. 5, the unit time corresponds to one GOV.

The uppermost plot in FIG. 5 represents master object information. In this case, the lower level indicates that the first object is a master object, and the higher level indicates that the second object is a master object. As is obvious from FIG. 5, the first object serves as a master object before time T1 and after time T2, and the second object serves as a master object between times T1 and T2. In terms of the sequence numbers of GOVS, the first object serves as a master object between 0 and 2 and from 6, and the second object serves as a master object between 3 and 5.

Since the encoding section 201 serves as a master until time T1, the second object is encoded with a delay corresponding to one GOV with respect to the first object. At time T1, the value of the master object information changes, and the master/slave relationship between the first and second objects is reversed. At this point of time, however, since encoding of GOV2(2) is not performed, the master/slave relationship is not immediately reversed but is reversed when the encoding section 202 completely encodes GOV2 (2), i.e., at time T3. From time T3, the encoding section 202 serves as a master, and the first object is encoded with a delay corresponding to one GOV with respect to the second object.

At time T2, the value of the master object information changes, and the master/slave relationship between the first and second objects is reversed. In the case of time T1, this relationship is not immediately reversed but is reversed at time T4 when encoding of GOV1(5) is completed. Subsequently, the encoding section 201 becomes a master again and performs encoding. The second object is encoded with a delay corresponding to one GOV with respect to the first object.

As obvious from the above description, every time master object switching occurs, a delay is accumulated. For this reason, this scheme cannot be applied to real-time encoding but can be applied to online encoding, e.g., reading object data from a storage medium and encoding it. Table 3 shows the generated code amount of each GOV. As is obvious from Table 3, although delays occur, the sum total of generated code amounts for each GOV between the objects accurately coincides with the unit time allowable code amount.

section for each object to distribute the remaining object unit time allowable code amount to a plurality of objects. Furthermore, master object information is input to this allowable code amount distributing section.

The results distributed by the allowable code amount distributing section are sent out to the VOP target code amount determining sections for the respective objects other than the master object. With this arrangement, three or more objects can be encoded. Note that a code amount can be distributed in the allowable code amount distributing section by using a device similar to that in the first embodiment.

The fourth embodiment of the present invention will be described next. The third embodiment has been described on the premise that accumulation of delays is allowed in encoding. In this embodiment, however, an encoding method in a case wherein accumulation of delays is not allowed will be described.

The arrangement of the encoding device is the same as that shown in FIG. 4, and the operation of each section is basically the same except for the time when a master object is switched to the other object. Assume that there is no time difference between the first and second objects when they are input, as in the second embodiment. In this case, encoding control based on the remaining object unit time allowable code amount output from a remaining object allowable code amount calculating section 104 is not performed for a GOV at the same timing as that of the first object which is used for this calculation but is performed for a delayed GOV. Likewise, encoding control based on the remaining object unit time allowable code amount output from a remaining object allowable code amount calculating section 204 is not performed for a GOV at the same timing as that of the second object which is used for this calculation but is performed for a delayed GOV.

At the time when a master object is switched to the other object, both encoding sections 201 and 202 operate in accordance with the VOP target code amounts output from VOP target code amount determining sections 205 and 105. That is, there is a point of time when the encoding sections

TABLE 3

| GOV No. | 0 | 1 | 2 | 3 | 4 | 5 | 6 | 7 | 8 | |
|---|---|---|---|---|---|---|---|---|---|---|
| First Object Generated Code Amount | $R_1(0)$ | $R_1(1)$ | $R_1(2)$ | $R-R_2(3)$ | $R-R_2(4)$ | $R-R_2(5)$ | $R_1(6)$ | $R_1(7)$ | $R_1(8)$ | ... |
| Second Object Generated Code Amount | $R-R_1(0)$ | $R-R_1(1)$ | $R-R_1(2)$ | $R_2(3)$ | $R_2(4)$ | $R_2(5)$ | $R-R_1(6)$ | $R-R_1(7)$ | $R-R_1(8)$ | ... |

According to this embodiment, an object serving as a master object is dynamically switched to another object in accordance with the master object information output from the master object determining section. Even if, therefore, the degree of importance of an object changes with a change in the area of the object or the like, the overall decoded image quality can be maintained high.

In this case as well, encoding sections for three or more objects can be formed. In this case, for each object, a section equivalent to the VOP target code amount determining section 205 in FIG. 4, a section equivalent to the code amount log storage section 103, and a section equivalent to the remaining object allowable code amount calculating section 104 are prepared. In addition, an allowable code amount distributing section may be connected to the output of the remaining object allowable code amount calculating operate as slaves. The operation of each section in this case will be described in detail later.

Figure 6:
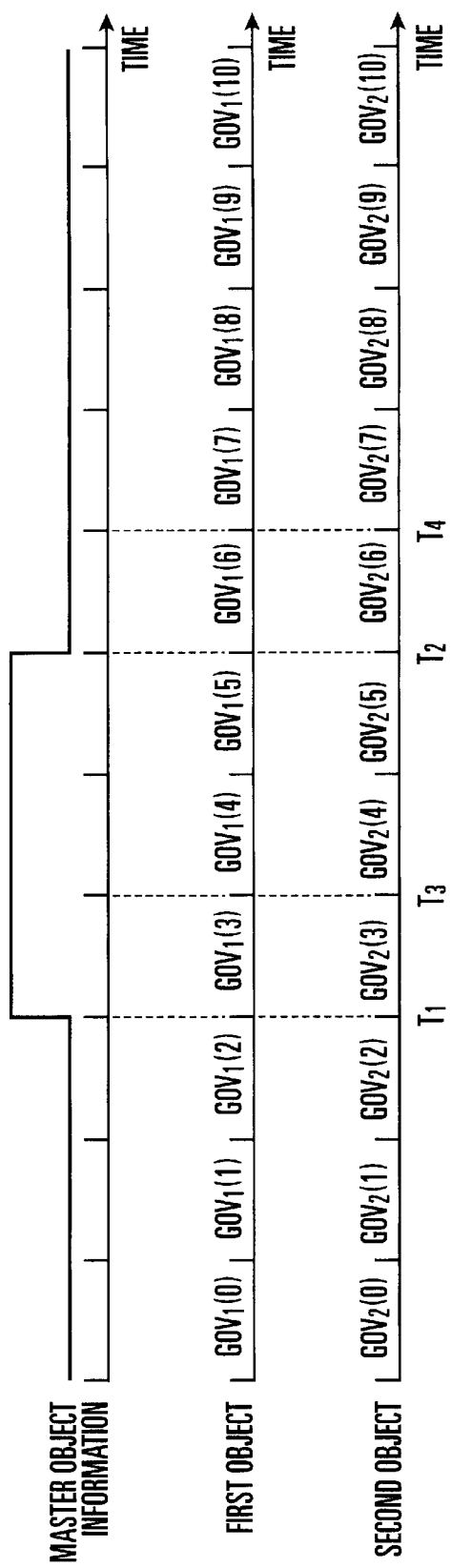
FIG. 6 is a view showing the relationship between the signal output from a master object determining section and objects encoded by two encoding sections on the time axis in a moving image encoding device according to the fourth embodiment of the present invention.

A specific example of encoding operation in a case wherein a master object is switched to the other object in accordance with master object information will be described next. FIG. 6 shows an example of the relationship between the master object information and the GOVs encoded by the encoding sections 201 and 202 on the time axis. In this case, the unit time corresponds to one GOV. The uppermost plot in FIG. 6 represents the master object information. The relationship between the master object and the level is the same as that shown in FIG. 5.

The encoding section 201 operates as a master up to time T1. Therefore, a unit time allowable code amount used for encoding control on the second object is calculated by using the generated code amount of the immediately preceding GOV of the first object. Note that the encoding section 202 also operates as a master in encoding the first GOV, i.e., GOV2(0).

At time T1, the value of the master object information changes to reverse the master/slave relationship between the first and second objects. However, the master/slave relationship is not reversed immediately after the value of the master object information changes but is reversed at time T3. The two encoding sections operate as slaves between times T1 and T3. That is, encoding of GOV2(3) is controlled in accordance with the generated code amount of GOV1(2), and encoding of GOV1(3) is controlled in accordance with the generated code amount of GOV2(0), as will be described later.

From time T3, the encoding section 202 operates as a master, and a unit time allowable code amount used for encoding control on the first object is calculated by using the generated code amount of the immediately preceding GOV of the second object. Note that in encoding GOV1(4) immediately after the master/slave relationship is reversed, the encoding section 201 also operates as a master.

At time T2, the value of the master object information changes, and the master/slave relationship between the first and second objects is reversed again. As in the case of time T1, this relationship is not immediately reversed but is reversed at time T4. The encoding sections operate as slaves in the interval between times T2 and T4. In this interval, encoding of GOV1(6) is controlled in accordance with the generated code amount of GOV2(5), and encoding of GOV2(6) is controlled in accordance with the generated code amount of GOV1(4), as will be described later.

Subsequently, the encoding section 201 operates as a master, and a unit time allowable code amount used for encoding control on the second object is calculated by using the generated code amount of the immediately preceding GOV of the first object. Note that the encoding section 202 also operates as a master in encoding GOV2(7) immediately after the master/slave relationship is reversed.

The generated code amount of each GOV will be described next. Table 4 shows the generated code amounts of the respective GOVs.

Before time T1, the encoding section 201 operates as a master, and the encoding section 202 operates as a slave. Therefore, the following relationship holds:

$R = R_1(m) + R_2(m+1)$

Note that when m=0, the two encoding sections operate as masters.

In the interval between times T1 and T3, in which the master object is switched to the other object, the encoding section 201 also operates as a slave to stay within the limitation imposed on the total allowable code amount. That is, encoding is controlled such that the generated code amount becomes R−R2(0). With this control, the generated code amount stays within the limitation on the allowable code amount even if the master object is switched to the other object.

In the interval between times T3 and T2, the encoding section 201 operates as a slave, and the encoding section 202 operates as a master. Except for m=4 immediately after master object switching, the following relationship holds:

$R = R_1(m+1) + R_2(m)$

When m=4, the two encoding sections operate as masters, as in the case of m=0.

In the interval between times T2 and T4, in which the master object is switched to the other object, the encoding section 202 also operates as a slave to satisfy the restriction of the total allowable code amount. That is, encoding is controlled such that the generated code amount becomes R−R1(4).

After time T4, the encoding section 201 operates as a master gain, and the encoding section 202 operates as a slave. Therefore, except for m=7 immediately after master object switching, the following relationship holds:

$R = R_1(m) + R_2(m+1)$

When m=7, the two encoding sections operate as masters, as in the case of m=0.

As described above, if the generated code amounts are totalized for each GOV between the objects, the sums vary. As in the second embodiment, if the generated code amounts are averaged in a long term, the resultant value basically falls within the allowable code amount. These variations can be absorbed by preparing a buffer for storing code sequences, temporarily storing code sequences in the buffer, and sending out the codes sequences to a transmission path while adjusting the timing.

According to this embodiment, there is provided an encoding device capable of encoding objects without any delay even if a master object is changed. In this case as well, encoding sections for three or more objects can be formed in the same manner as in the third embodiment.

The fifth embodiment of the present invention will be described next. The overall arrangement of the encoding

TABLE 4

| GOV No. | 0 | 1 | 2 | 3 | 4 | 5 | 6 | 7 | 8 | 9 | |
|---|---|---|---|---|---|---|---|---|---|---|---|
| First Object Generated Code Amount | $R_1(0)$ | $R_1(1)$ | $R_1(2)$ | $R-R_2(0)$ | $R_1(4)$ | $R-R_2(4)$ | $R-R_2(5)$ | $R_1(7)$ | $R_1(8)$ | $R_1(9)$ | ... |
| Second Object Generated Code Amount | $R_2(0)$ | $R-R_1(0)$ | $R-R_1(1)$ | $R-R_1(2)$ | $R_2(4)$ | $R_2(5)$ | $R-R_1(4)$ | $R_2(7)$ | $R-R_1(7)$ | $R-R_1(8)$ | ... | device of this embodiment is the same as that shown in FIG. 4. FIG. 7 shows the arrangement of an encoding section 201.

Referring to FIG. 7, master object information is input to a switch control section 315. An output (switch control information) from the switch control section 315 is output to switch sections 303 to 305. The first object data and the output from the switch control section 315 are input to the switch section 303. The first output (object data) of the switch section 303 is connected to an input buffer 311, and the second output (object data) is connected to a master encoding section 301. The second output from the switch section 303, master object information, and a unit time allowable code amount are input to the master encoding section 301. The first output (first code sequence) of the master encoding section 301 is connected to an output buffer 310, the second output outputs the first generated code amount, and the third output (master encoding information) is connected to the switch section 305.

The first output from the master encoding section 301 is input to the output buffer 310, and the output (first code sequence) of the output buffer 310 is connected to the switch section 304. The first output of the switch section 303 is connected to the input buffer 311, and the output (object data) of the input buffer 311 is connected to a slave encoding section 302. An output from the input buffer 311, master object information, and VOP target code amount are input to the slave encoding section 302. The first output (second code sequence) of the slave encoding section 302 is connected to the switch section 304, and the second output outputs the second generated code amount. The third output of the slave encoding section 302 outputs the second encoding information, and the fourth output (slave encoding information) is connected to the switch section 305.

The switch section 304 receives the first output from the slave encoding section 302, an output from the output buffer 310, and an output from the switch control section 315. The output (code sequence) of the switch section 304 outputs the first object code sequence. The switch section 305 receives the third output from the master encoding section 301, the fourth output from the slave encoding section 302, and the output from the switch control section 315. The output of the switch section 305 outputs the first encoding information.

The operation of the encoding section 201 having the above arrangement will be described next.

The switch control section 315 outputs switch information for controlling the switches in accordance with input master object information. In accordance with this switch information, switching is performed, and the operation of the encoding section 201 changes. First, operation in a steady state in a case wherein the first object is a master object will be described. Second, operation in a steady state in a case wherein the first object is not a master object will described. Finally, operation in a case wherein master object information changes will be described.

Operation in a steady state in a case wherein the first object is a master object will be described first. In this case, the respective switch sections are controlled to encode the first object by using the master encoding section 301. That is, the switch section 303 sets the master encoding section 301 as an output destination. The switch section 304 sets the output buffer 310 as an input destination. The switch section 305 sets the master encoding section 301 as an input destination.

When connection is made in the above manner, the first object data is input to the master encoding section 301 through the switch section 303. The master encoding section 301 is designed to operate when the master object information indicates that the first object is a master object. The operation of the master encoding section 301 is basically the same as that of the encoding section 101 in FIG. 1. That is, the master encoding section 301 encodes the first object within the unit time allowable code amount, and outputs the resultant code sequence as the first code sequence to the output buffer 310. At the same time, the master encoding section 301 outputs the generated code amount as the first generated code amount outside the encoding section 201, and outputs encoding information as the first encoding information outside the encoding section 201 through the switch section 305.

The output buffer 310 stores the first code sequence only for a unit time. If, for example, the unit time corresponds to one GOV, the first code sequence is stored in the output buffer 310 for a period of time corresponding to one GOV. As a consequence, a delay corresponding to the unit time occurs between the input and output of the output buffer 310, and the output code sequence is output as the first object code sequence through the switch section 304.

Operation in a steady state in a case wherein the first object is not a master object will be described next. In this case, the respective switches are controlled to encode the first object by using the slave encoding section 302. More specifically, the switch section 303 sets the input buffer 311 as an output destination. The switch section 304 sets the slave encoding section 302 as an input destination. The switch section 305 sets the slave encoding section 302 as an input destination.

When connection is made in the above manner, the first object data is input to the input buffer 311 through the switch section 303. The first object data is stored in this buffer for a unit time. If, for example, the unit time corresponds to one GOV, the data is stored in the input buffer 311 for a period corresponding to one GOV. As a consequence, a delay corresponding to the unit time occurs between the input and output of the input buffer 311. The output object data is input to the slave encoding section 302.

The slave encoding section 302 is designed to operate when the master object information indicates that the first object is not a master object, except when the master object information changes. The operation of the slave encoding section 302 is basically the same as that of the encoding section 102 in FIG. 1. The first object data is encoded by performing encoding control such that the generated code amount of each VOP becomes equal to an input VOP target code amount. The resultant code sequence is output as the second code sequence to the switch section 304. At the same time, the generated code amount is output as the second generated code amount, and encoding information is output as the second encoding information outside the encoding section 201. In addition, the encoding information is output as the first encoding information to the outside through the switch section 305. The first encoding information and second encoding information may be identical to each other or different from each other.

Operation in a case wherein master object information changes will be described next.

If the first object that has been a master object changes to a slave object, the switch section 303 changes the output destination from the master encoding section 301 to the input buffer 311 at the same time when the switch control information changes. The switch section 305 changes the input destination from the master encoding section 301 to the slave encoding section 302 at an arbitrary time within the unit time after the switch control information changes.

The switch section 304 changes the input destination from the output buffer 310 to the slave encoding section 302 with a delay corresponding to the unit time after the switch control information changes. As a result, the data stored in the output buffer 310 is output as the first object code sequence for the unit time after the switch control information changes. After this operation, switching is performed to output the output from the slave encoding section 302 as the first object code sequence.

The master encoding section 301 stops encoding when the master object information changes. On the other hand, the slave encoding section 302 starts encoding the unit time after the master object information changes.

If the first object which has not been a master object becomes a master object, the switch section 303 changes the output destination from the input buffer 311 to the master encoding section 301 at the same time when the switch control information changes. The switch section 305 changes the input destination from the slave encoding section 302 to the master encoding section 301 at the same time the switch control information changes.

The switch section 304 changes the input destination from the slave encoding section 302 to the output buffer 310 with a delay corresponding to the unit time after the switch control information changes. As a consequence, an output from the slave encoding section 302 is output as the first object code sequence for the unit time after the switch control information changes. After this operation, switching is performed to output the output from the output buffer 310 as the first object code sequence. The slave encoding section 302 continues encoding for the unit time when the master object information changes. Thereafter, the slave encoding section 302 stops encoding. The master encoding section 301 starts encoding when the master object information changes.

The operation of the encoding section 201 has been described above. An encoding section 202 has the same arrangement as that shown in FIG. 7, and operates in the same manner. Note that encoding performed by the master encoding section and slave encoding section in the encoding section 202 may differ from that in the encoding section 201. For example, a foreground object (first object) may be encoded by MPEG-4, and a background object (second object) may be encoded by MPEG-2.

A specific example of the operation of the encoding device in a case wherein master object information changes will be described next.

Figure 8:
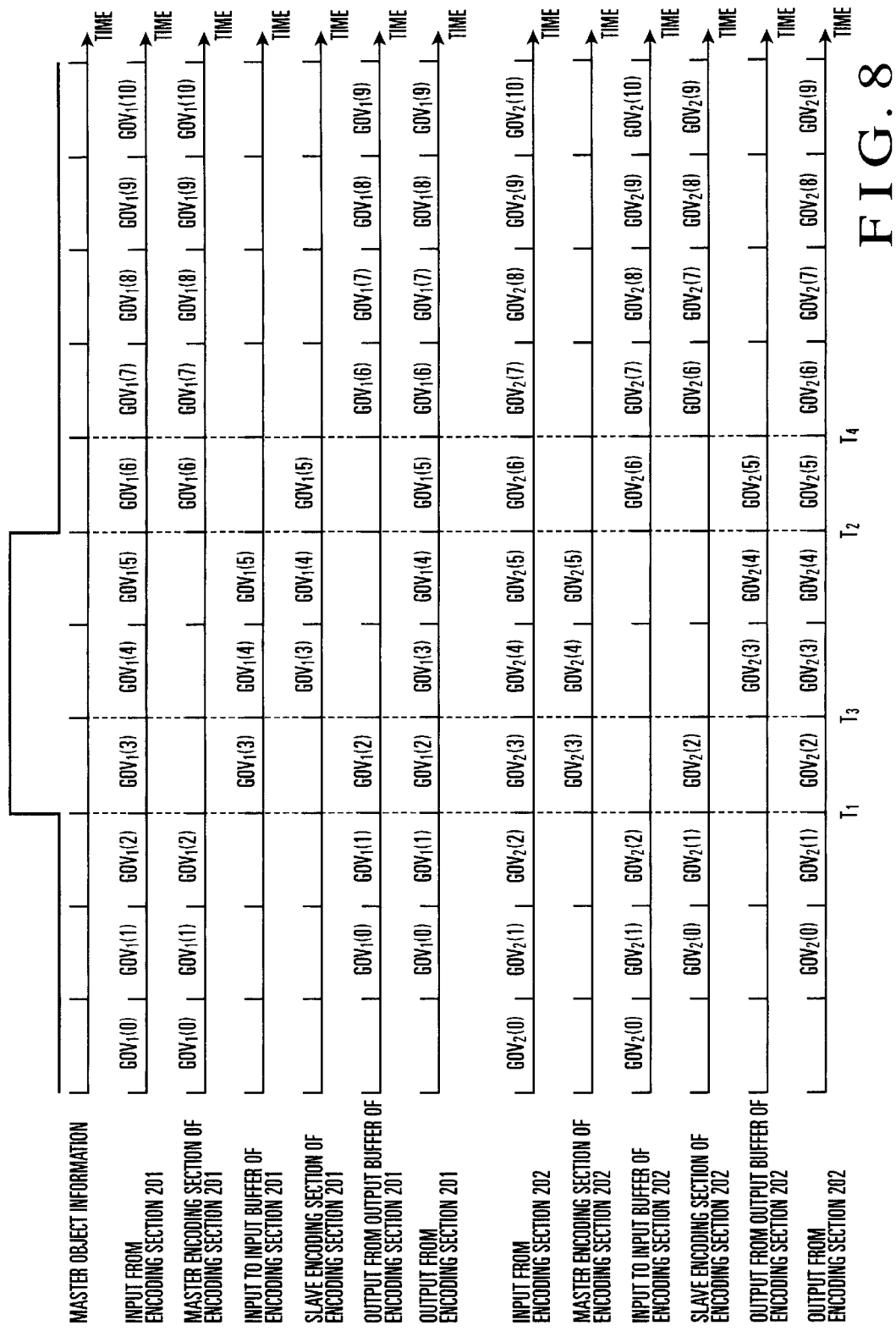
FIG. 8 is a view showing the relationship between the signal output from a master object determining section 206 and objects encoded by two encoding sections on the time axis in the moving image encoding device according to the fifth embodiment of the present invention.

FIG. 8 shows the relationship between master object information, the GOVs encoded by the master and slave encoding sections of the encoding sections 201 and 202, the GOVs input to the input buffers, and the GOVs output from the output buffers on the time axis. In this case, a unit time corresponds to one GOV. The uppermost plot in FIG. 8 represents the master object information. The relationship between the master object and the level is the same as that shown in FIG. 5. As is obvious from FIG. 8, the first object serves as a master object before time T1 and after time T2, and the second object serves as a master object in the interval between times T1 and T2. In terms of the sequence numbers of GOVs, the first object serves as a master object between 0 and 2 and from 6, and the second object serves as a master object between 3 and 5.

Since the first object serves as a master object up to time T1, the first object is encoded by the master encoding section, and the second object is encoded by the slave encoding section. Since the second object is stored in the input buffer for a period of time corresponding to one GOV, the second object is encoded with a delay corresponding to one GOV with respect to the first object.

At time T1, the value of the master object information changes, and the master/slave relationship between the first object and the second object is reversed. In the encoding section 202, both the master encoding section and the slave encoding section operate for a period of time corresponding one GOV after the relationship is reversed, i.e., up to time T3. That is, the slave encoding section encodes GOV2(2), and at the same time, the master encoding section encodes GOV2(3).

In the encoding section 201, both the master encoding section and the slave encoding section do not operate in the interval between times T1 and T3. At time T3, the slave encoding section starts encoding. As a consequence, the first object is encoded with a delay corresponding to one GOV with respect to the second object.

Since the second object serves as a master object in the interval between times T3 and T2, the second object is encoded by the master encoding section, and the first object is encoded by the slave encoding section. Since the first object is stored in the input buffer for a period of time corresponding to one GOV, the first object is encoded with a delay corresponding to one GOV with respect to the second object.

At time T2, the value of the master object information changes, and the master/slave relationship between the first object and the second object is reversed. In the encoding section 201, both the master encoding section and the slave encoding section operate for a period of time corresponding one GOV after the relationship is reversed, i.e., up to time T4. That is, the slave encoding section encodes GOV1(5), and at the same time, the master encoding section encodes GOV1(6).

In the encoding section 202, both the master encoding section and the slave encoding section do not operate in the interval between times T2 and T4. At time T4, the slave encoding section starts encoding. As a consequence, the second object is encoded with a delay corresponding to one GOV with respect to the first object. Subsequently, the first object becomes a master object again, and encoding is performed. The second object is encoded with a delay corresponding to one GOV with respect to the first object.

As described above, both the master encoding section and the slave encoding section simultaneously operate in some intervals as in the encoding section 202 in the interval between times T1 and T3 and the encoding section 201 in the interval between times T2 and T4. No problem arises when GOVs are encoded as closed GOVs. Otherwise, motion compensation suffers dependence between adjacent GOVs, leading to an inability to encode GOVs. However, in this case as well, if master object switching occurs, GOVs can be encoded by handling them as closed GOVs. Alternatively, VOPs may be encoded after the encoding order is changed. With regard to a VOP to be referred to from the adjacent GOVs, the two encoding sections are allowed to refer to this VOP. This makes it possible to encode the VOP.

As described above, in this device, even if master object switching occurs, since no delay is accumulated, online encoding can be realized in a case wherein a certain degree of delay is permitted.

Note that the generated code amount for each GOV is the same as that in Table 3, and the sum total of generated code amounts for each GOV between the objects accurately coincides with the unit time allowable code amount. In this case as well, encoding sections for three or more objects can be formed in the same manner as in the fourth embodiment.

Figure 9:
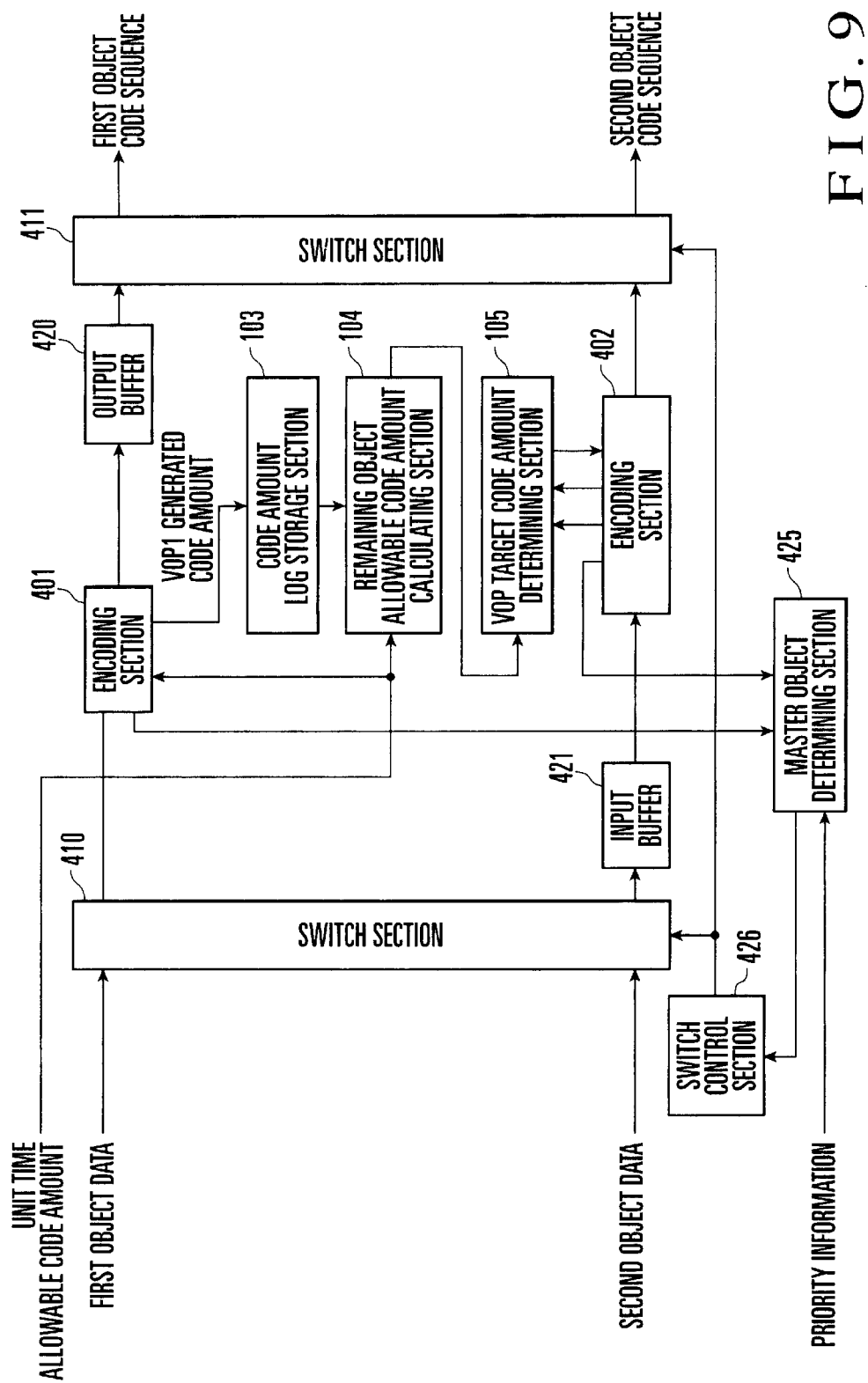
FIG. 9 is a block diagram showing a moving image encoding device according to the sixth embodiment of the present invention.

The sixth embodiment of the present invention will be described next. FIG. 9 shows a moving image encoding device according to this embodiment.

The encoding device in FIG. 9 differs from the encoding device in FIG. 1 in that the encoding sections 101 and 102 are replaced with encoding sections 401 and 402, and a master object determining section 425, switch control section 426, input buffer 421, output buffer 420, and switch sections 410 and 411 are newly added.

The master object determining section 425 receives priority information, the third output from the encoding section 401, and the fourth output from the encoding section 402. The output (master object information) of the master object determining section 425 is connected to the switch control section 426. The switch control section 426 receives an output from the master object determining section 425. The output (switch control information) of the switch control section 426 is connected to the switch sections 410 and 411.

The switch section 410 receives an output from the switch control section 426 and the first and second object data. The first output (master object data) of the switch section 410 is connected to the encoding section 401, and the second output (slave object data) is connected to the input buffer 421.

The first output from the switch section 410 and a unit time allowable code amount are input to the encoding section 401. The first output (code sequence) of the encoding section 401 is connected to the output buffer 420, the second output (generated code amount) is connected to a code amount log storage section 103, and the third output (encoding information) is connected to the master object determining section 425. The first output from the encoding section 401 is input to the output buffer 420. The output (code sequence) of the output buffer 420 is connected to the switch section 411.

The second output from the switch section 410 is input to the input buffer 421. The output (slave object data) of the input buffer 421 is connected to the encoding section 402. An output from the input buffer 421 is input to the encoding section 402. The first output (code sequence) of the encoding section 402 is connected to the switch section 411, the second output (generated code amount) is connected to the VOP target code amount determining section 105, the third output (encoding information) is connected to the VOP target code amount determining section 105, and the fourth output (encoding information) is connected to the master object determining section 425.

The switch section 411 receives an output from the switch control section 426, an output from the output buffer 420, and the first output from the encoding section 402. The first output of the switch section 411 outputs the first object code sequence, and the second output outputs the second object code sequence. The connection relationship between the remaining sections is the same as that in the encoding section in FIG. 1.

The operation of the moving image encoding device having the above arrangement will be described next.

The operation of the master object determining section 425 is the same as that of the master object determining section 206 in FIG. 4. That is, the master object determining section 425 determines a master object on the basis of input priority information, the encoding information output from the encoding section 401, and the first encoding information output from the encoding section 402, and outputs information indicating which object is a master object as master object information to the switch control section 426.

The operation of the switch control section 426 is the same as that of the switch control section 315 in FIG. 7. That is, the switch control section 426 outputs switch control information for controlling the switches in accordance with input master object information. First, operation in a steady state in a case wherein the first object is a master object will be described. Second, operation in a steady state in a case wherein the first object is not a master object will be described. Finally, operation in a case wherein master object information changes will be described.

Operation in a steady state in a case wherein the first object is a master object will be described first. In this case, the switch section 410 is controlled to encode the first object by using the encoding section 401 and encode the second object by using the encoding section 402. That is, the input of the first object data is connected to the output of the encoding section 401, and the input of the second object data is connected to the output of the input buffer 421.

In addition, the switch section 411 is controlled to set the code sequence created by encoding in the encoding section 401 as the first object code sequence and set the code sequence created by encoding in the encoding section 402 as the second object code sequence. That is, the input from the output buffer 420 is connected to the output of the first object code sequence, and the input of the encoding section 402 is connected to the output from the second object code sequence.

With this connection, the first object data is input to the encoding section 401 through the switch section 410. The operation of the encoding section 401 is the same as that of the encoding section 101 in FIG. 1. That is, the encoding section 401 encodes input object data within an input unit time allowable code amount, outputs the resultant code sequence to the output buffer 420, and also outputs the generated code amount to the code amount log storage section 103. In addition, the encoding section 401 outputs the encoding information to the master object determining section 425.

The code sequence output from the encoding section 401 is input to the output buffer 420, in which the code sequence is stored for a unit time. If, for example, the unit time corresponds to one GOV, the code sequence is stored in the output buffer 420 for a period of time corresponding to one GOV. As a consequence, a delay corresponding to the unit time occurs between the input and output of the output buffer 420. The code sequence output from the output buffer 420 is output as the first object code sequence through the switch section 411.

The second object data is input to the input buffer 421 through the switch section 410. As in the case of the output buffer 420, the object data is stored in this buffer for the unit time. As a consequence, a delay corresponding to the unit time also occurs between the input and output of the input buffer 421.

The object data output from the input buffer 421 is input to the encoding section 402. The operation of the encoding section 402 is the same as that of the encoding section 102 in FIG. 1. That is, the encoding section 402 performs encoding control in accordance with the VOP target code amount output from a VOP target code amount determining section 105, encodes the object data input from the input buffer 421, and outputs the resultant code sequence. In addition, the encoding section 402 outputs the generated code amount to the VOP target code amount determining section 105 and outputs the second encoding information to the VOP target code amount determining section 105. The encoding section 402 also outputs the first encoding information to the master object determining section 425. The code sequence output from the encoding section 402 is output as the second object code sequence through the switch section 411. The operations of the remaining sections are the same as those in FIG. 1.

Operation in a steady state in a case wherein the second object is a master object will be described next. In this case, the switch section 410 is controlled to encode the second object by using the encoding section 401 and encode the first object by using the encoding section 402. That is, the input of the first object data is connected to the input buffer 421, and the input of the second object data is connected to the output of the encoding section 401.

In addition, the switch section 411 is controlled to set the code sequence created by encoding in the encoding section 401 as the second object code sequence and set the code sequence created by encoding in the encoding section 402 as the first object code sequence. That is, the input from the output buffer 420 is connected to the output of the second object code sequence, and the input of the encoding section 402 is connected to the output from the first object code sequence.

With this connection, the second object data is input to the encoding section 401 through the switch section 410 and encoded. The created code sequence is output to the output buffer 420, in which a delay corresponding to the unit time occurs. Thereafter, the code sequence is output as the second object code sequence through the switch section 411.

The first object data is input to the input buffer 421 through the switch section 410, in which a delay corresponding to the unit time occurs. Thereafter, the data is input to the encoding section 402 and encoded. The created code sequence is output as the first object code sequence through the switch section 411. The operations of the remaining sections are the same as those in FIG. 1.

Operation in a case wherein master object information changes will be described next. When the first object that has been a master object changes to a slave object, the switch section 410 performs switching operation at the same time when switch control information changes. More specifically, the switches are operated to connect the input of the first object data to the output to the input buffer 421 and connect the input of the second object data to the output to the encoding section 401.

The switch section 411 performs switching operation the unit time after a switch control signal changes. More specifically, the input from the output buffer 420 is connected to the output of the second object code sequence, and the input from the encoding section 402 is connected to the output of the first object code sequence. As a consequence, the second object is encoded by the two encoding sections 401 and 402 for the unit time after the switch control signal changes.

When the first object that has not been a master object becomes a master object, the switch section 410 performs switching operation at the same time when the switch control information changes. More specifically, the switches are operated to connect the input of the first object data to the output to the encoding section 401 and connect the input of the second object data to the output to the input buffer 421.

In addition, the switch section 411 performs switching operation the unit time after the switch control signal changes. More specifically, the input from the output buffer 420 is connected to the output of the first object code sequence, and the input from the encoding section 402 is connected to the output of the second object code sequence. As a consequence, the first object is encoded by the two encoding sections 401 and 402 for the unit time after the switch control signal changes.

A specific example of the operation of the encoding device in a case wherein master object information changes will be described next.

Figure 10:
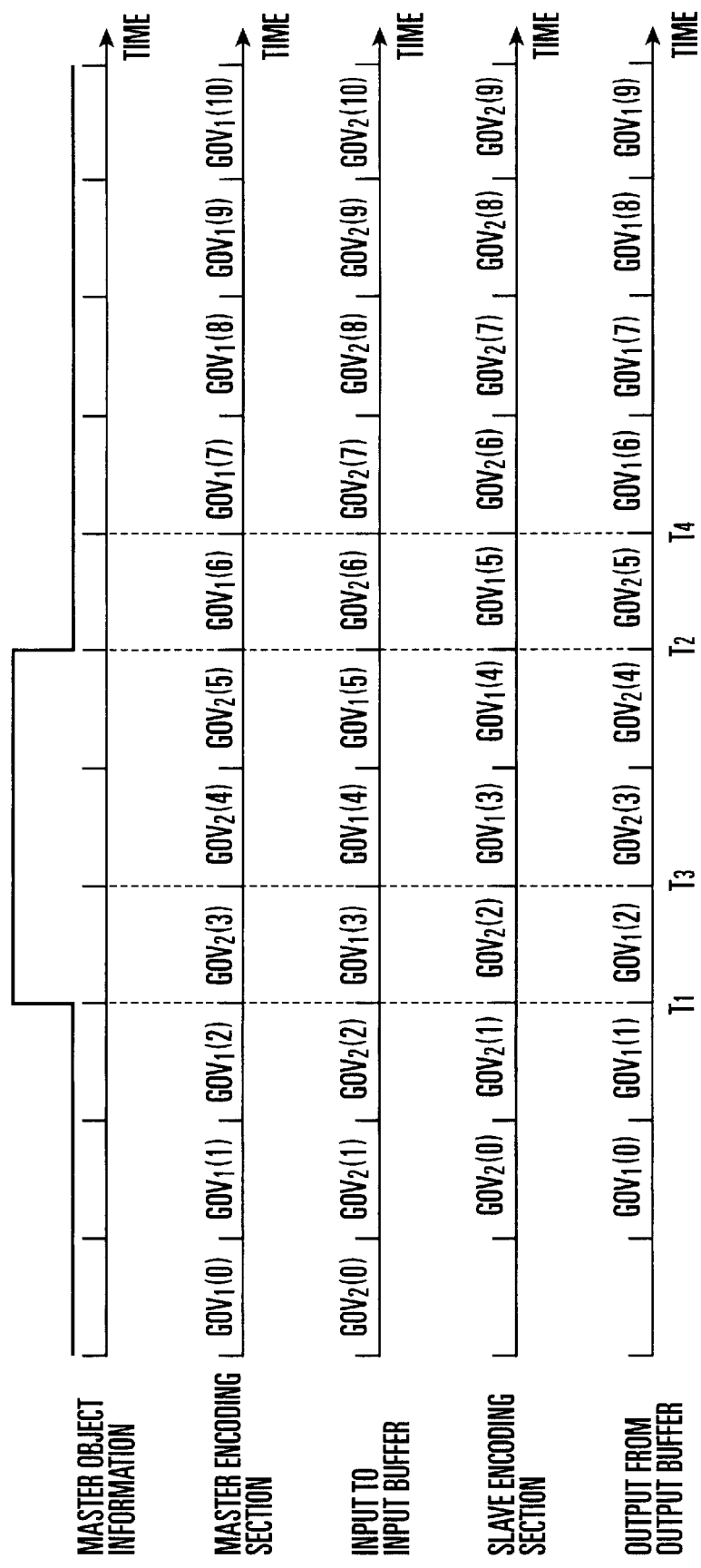
FIG. 10 is a view showing the relationship between the signal output from a master object determining section and objects encoded by two encoding sections on the time axis in the moving image encoding device shown in FIG. 9.
Figure 11:
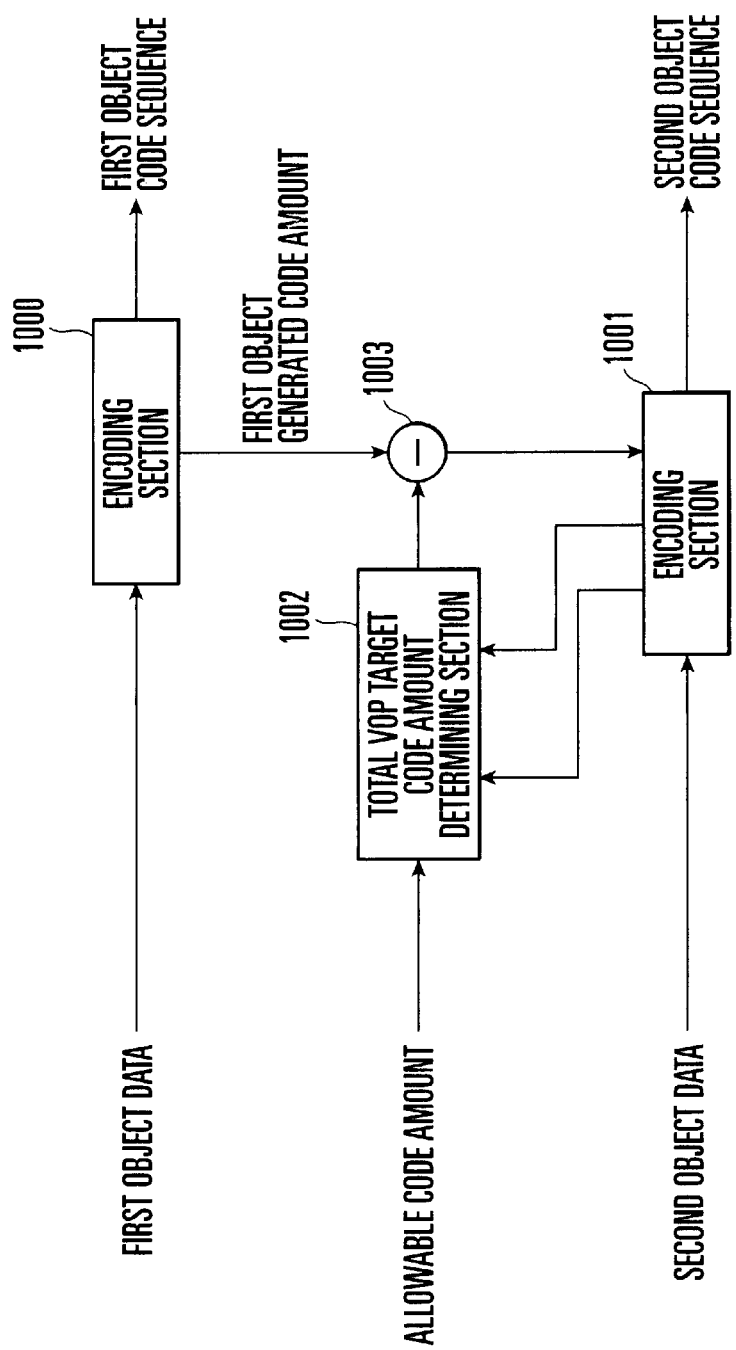
FIG. 11 is a block diagram showing a conventional moving image encoding device.

FIG. 10 shows an example of the relationship between the master object information, the GOVs encoded by the encoding sections 401 and 402, the GOVs input to the input buffer 421, and the GOVs output from the output buffer 420 on the time axis. In this case, a unit time corresponds to one GOV. The uppermost plot in FIG. 10 represents the master object information. The relationship between the master object and the level is the same as that shown in FIG. 5. As is obvious from FIG. 10, the first object serves as a master object before time T1 and after time T2, and the second object serves as a master object in the interval between times T1 and T2. In terms of the sequence numbers of GOVs, the first object serves as a master object between 0 and 2 and from 6, and the second object serves as a master object between 3 and 5.

Since the first object serves as a master object up to time T1, the first object is encoded by the encoding section 401, and the second object is encoded by the encoding section 402. Since the second object is stored in the input buffer 421 for a period of time corresponding to one GOV, the second object is encoded with a delay corresponding to one GOV with respect to the first object.

At time T1, the value of the master object information changes, and the master/slave relationship between the first and second objects is reversed. After the relationship is reversed, both the encoding sections 401 and 402 encode the second object data during a period of time corresponding to one GOV, i.e., up to time T3. That is, the encoding section 402 encodes GOV2(2), and at the same time, the encoding section 401 encodes GOV2(3).

In the interval between times T3 and T2, the second object serves as a master object and is encoded by the encoding section 401. Meanwhile, the first object is encoded by the encoding section 402. Since the first object is stored in the input buffer 421 for a period of time corresponding to one GOV, the first object is encoded with a delay corresponding to one GOV with respect to the second object.

At time T2, the value of the master object information changes, and the master/slave relationship between the first and second objects is reversed. After the relationship is reversed, both the encoding sections 401 and 402 encode the first object data for a period of time corresponding to one GOV, i.e., up to time T4. That is, the encoding section 402 encodes GOV1(5), and at the same time, the master encoding section 401 encodes GOV1(6). Subsequently, the first object becomes a master object again and is encoded, and the second object is encoded with a delay corresponding to one GOV with respect to the first object.

As described above, there are time intervals, e.g., the interval between times T1 and T3 and the interval between times T2 and T4, in which the two encoding sections 401 and 402 encode the same object. No problem arises when GOVs are encoded as closed GOVS. Otherwise, motion compensation suffers dependence between adjacent GOVs, leading to an inability to encode GOVs. However, in this case as well, encoding can be performed by coping with this problem in the same manner as in the fifth embodiment.

According to this embodiment, even if master object switching occurs, since no delay is accumulated, online encoding can be realized in a case wherein a certain degree of delay is permitted. In addition, each encoding section need not include both a master encoding section and a slave encoding section unlike the arrangement shown in FIG. 7, thus realizing similar processing with a simple arrangement.

Note that as the encoding sections 401 and 402, a plurality of encoding sections are prepared, and an output from the master object determining section 425 is also input to the encoding sections 401 and 402. Of these encoding sections, a proper encoding section may be selected in accordance with the type of an input object. This makes it possible to form an encoding section that performs operation equivalent to that in the fifth embodiment.

In this case as well, encoding sections for three or more objects can be formed in the same manner as in the first embodiment. Assume, however, that the switch sections 410 and 411 are designed to interchange arbitrary two objects of a plurality of objects.

A recording medium recording a program for implementing the above device will be described next. A recording medium recording a program for implementing the encoding device and decoding device according to the present invention can be implemented by programming the above device in a computer-readable program language and recording the program on a recording medium such as a CD-ROM (Compact Disk-Read Only Memory), FD (Flexible Disk), or nonvolatile memory card.

As has been described above, the present invention has the following effects.

First, even if the generated code amount of a VOP of a main object temporarily increases, the influence of this increase on encoding of the other object can be reduced, thereby keeping the image quality of an overall decoded image high.

This is because, even if the generated code amount of a specific VOP of a main object increases, the influence of this increase on encoding of the other object can be evenly dispersed within a unit time. This makes it possible to suppress extreme variations in the code amount of the other object.

Second, the master/slave relationship between objects can be dynamically changed in accordance with the contents of an image.

This is because the present invention has the mechanism of dynamically changing an object to be a main object in accordance with the information output from the master object determining section. Even if, therefore, the degree of importance of an object changes with a change in the area of the object, the quality of the overall decoded image can be kept high by dynamic control.

What is claimed is:

1. A moving image encoding device for encoding a plurality of objects, comprising:

first object encoding means for encoding input first object data within a unit time allowable code amount representing an allowable code amount in a unit time to create and output a first object code sequence, and outputting a first object generated code amount;

code amount log storage means for storing the first object generated code amount;

remaining object allowable code amount calculating means for adding up the first object generated code amount output from said code amount log storage means within each time interval with the unit time length to obtain a sum value, and subtracting the sum value from the unit time allowable code amount, thereby calculating a remaining object unit time allowable code amount;

second object encoding means for encoding each VOP (Video Object Plane) of second object data by performing encoding control in accordance with an input second object VOP target code amount to create and output a second object code sequence, and outputting second object encoding information including at least one of quantization information, motion information, activity information, encoding error information, and object size information, and outputting a second object generated code amount; and second object VOP target code amount determining means for distributing the remaining object unit time allowable code amount to each VOP whose generation time is included in an time interval with the unit time length on the basis of the second object encoding information and the second object generated code amount, and calculating the second object VOP target code amount that is a target value of a code amount in encoding each VOP of the second object.

2. A device according to claim 1, wherein the interval within which the first object generated code amount is added up by said remaining object allowable code amount calculating means coincides on the time axis with the interval in which the second object VOP target code amount is calculated by said second object VOP target code amount determining means.

3. A device according to claim 1, wherein the interval within which the first object generated code amount is added up by said remaining object allowable code amount calculating means advances by not less than the unit time on the time axis compared to the interval as a calculation target interval in which the second object VOP target code amount is calculated by said second object VOP target code amount determining means.

4. A device according to claim 1, further comprising remaining object allowable code amount distributing means for distributing the remaining object unit time allowable code amount to an object other than a master object and outputting the remaining object unit time allowable code amount to object VOP target code amount determining means other than object VOP target code amount determining means for each object other than the master object.

5. A moving image encoding device for encoding a plurality of objects, comprising:

master object determining means for determining an object to become a master by using input first object first encoding information, input second object first encoding information, and input priority information, and outputting master object information representing which object is a master;

first object encoding means for, when the master object information indicates that the first object is a master object, encoding first object data within a unit time allowable code amount representing an allowable code amount in a unit time to create and output a first object code sequence, and outputting the first object first encoding information including at least one of quantization information, motion information, activity information, encoding error information, and object size information, and a first object first generated code amount, and when the master object information indicates that an object other than the first object is a master object, encoding each VOP of the first object data by performing encoding control in accordance with an input first object VOP target code amount to create and output a first object code sequence, and outputting the first object first encoding information including at least one of quantization information, motion information, activity information, encoding error information, and object size information, first object second encoding information including at least one of quantization information, motion information, activity information, encoding error information, and object size information, and a first object second generated code amount;

first object VOP target code amount determining section for distributing an input first remaining object unit time allowable code amount to each VOP whose generation time is included in a time with the unit time length on the basis of the first object second encoding information and the first object second generated code amount, and calculating the first object VOP target code amount that is a target value of a code amount in encoding each VOP of the first object;

first code amount log storage means for storing the first object first generated code amount information;

first remaining object allowable code amount calculating means for adding up the first object first generated code amount output from said first code amount log storage means within each time interval with the unit time length to obtain a sum value, and subtracting the sum value from the unit time allowable code amount, thereby calculating a second remaining object unit time allowable code amount;

second object encoding means for, when the master object information indicates that the second object is a master object, encoding second object data within a unit time allowable code amount representing an allowable code amount in a unit time to create and output a second object code sequence, and outputting the second object first encoding information including at least one of quantization information, motion information, activity information, encoding error information, and object size information, and a second object first generated code amount, and when the master object information indicates that an object other than the second object is a master object, encoding each VOP of the second object data by performing encoding control in accordance with an input second object VOP target code amount to create and output a second object code sequence, and outputting the second object first encoding information including at least one of quantization information, motion information, activity information, encoding error information, and object size information, second object second encoding information including at least one of quantization information, motion information, activity information, encoding error information, and object size information, and a second object second generated code amount;

second object VOP target code amount determining section for distributing an input second remaining object unit time allowable code amount to each VOP whose generation time is included in a time interval with the unit time length on the basis of the second object second encoding information and the second object second generated code amount, and calculating the second object VOP target code amount that is a target value of a code amount in encoding each VOP of the second object;

second code amount log storage means for storing the second object first generated code amount information;

second remaining object allowable code amount calculating means for adding up the second object first generated code amount output from said second code amount log storage means within each time interval with the unit time length to obtain a sum value, and subtracting the sum value from the unit time allowable code amount, thereby calculating the first remaining object unit time allowable code amount.

6. A device according to claim 5, wherein the interval within which the first object first generated code amount is added up by said first remaining object allowable code amount calculating means coincides on the time axis with the interval in which the second object VOP target code amount is calculated by said second object VOP target code amount determining means, and the interval within which the second object first generated code amount is added up by said second remaining object allowable code amount calculating means coincides on the time axis with the interval in which the first object VOP target code amount is calculated by said first object VOP target code amount determining means.

7. A device according to claim 5, wherein the interval within which the first object first generated code amount is added up by said first remaining object allowable code amount calculating means advances by not less than the unit time on the time axis compared to the interval as a calculation target interval in which the second object VOP target code amount is calculated by said second object VOP target code amount determining means, and the interval within which the second object first generated code amount is added up by said second remaining object allowable code amount calculating means advances by not less than the unit time on the time axis compared to the interval in which the first object VOP target code amount is calculated by said first object VOP target code amount determining means.

8. A device according to claim 5, wherein said first object encoding means comprises:

first object switch control means for outputting a first object switch control signal as a signal that controls switches in accordance with the master object information;

first object input switch means for selecting an output destination in accordance with the first object switch control signal, and outputting the first object data to the selected output destination;

first object master encoding means for, when the master object information indicates that the first object is a master object, encoding the first object data output from one output of said first object input switch means within the unit time allowable code amount to create and output a first object first code sequence, and outputting first object master encoding information including at least one of quantization information, motion information, activity information, encoding error information, and object size information and the first object first generated code amount;

first object output storage means for temporarily storing the first object first code sequence;

first object input storage means for temporarily storing the first object data output from the other output of said first object input switch means;

first object slave encoding means for, when the master object information indicates that an object other than the first object is a master object, encoding each VOP of the first object data output from said first object input storage means by performing encoding control in accordance with the first object VOP target code amount to create and output a first object second code sequence, and outputting the first object second encoding information including at least one of quantization information, motion information, activity information, encoding error information, and object size information, first object slave coding information including at least one of the quantization information, motion information, activity information, encoding error information, and object size information and the first object second generated code amount;

first object output switch means for selecting one of a first object first code sequence output from said first object output storage means and the first object second code sequence in accordance with the first object switch control signal, and outputting the selected code sequence as the first object code sequence; and first object encoding information switch means for selecting one of the first object master encoding information and the first object slave encoding information in accordance with the first object switch control signal and outputting the selected information as the first object first encoding information, and said second object encoding means comprises:
second object switch control means for outputting a second object switch control signal as a signal that controls switches in accordance with the master object information;
second object input switch means for selecting an output destination in accordance with the second object switch control signal, and outputting the second object data to the selected output destination;
second object master encoding means for, when the master object information indicates that the second object is a master object, encoding the second object data output from one output of said second object input switch means within the unit time allowable code amount to create and output a second object first code sequence, and outputting second object master encoding information including at least one of quantization information, motion information, activity information, encoding error information, and object size information, second object slave coding information including at least one of the quantization information, motion information, activity information, encoding error information, and object size information and the second object first generated code amount;
second object output storage means for temporarily storing the second object first code sequence;
second object input storage means for temporarily storing the second object data output from the other output of said second object input switch means;
second object slave encoding means for, when the master object information indicates that an object other than the second object is a master object, encoding each VOP of the second object data output from said second object input storage means by performing encoding control in accordance with the second object VOP target code amount to create and output a second object second code sequence, and outputting the second object second encoding information including at least one of quantization information, motion information, activity information, encoding error information, and object size information and the second object second generated code amount;
second object output switch means for selecting one of a second object first code sequence output from said second object output storage means and the second object second code sequence in accordance with the second object switch control signal, and outputting the selected code sequence as the second object code sequence; and
second object encoding information switch means for selecting one of the second object master encoding information and the second object slave encoding information in accordance with the second object switch control signal and outputting the selected information as the second object first encoding information.

9. A device according to claim 5, further comprising remaining object allowable code amount distributing means for distributing the remaining object unit time allowable code amount to an object other than a master object and outputting the remaining object unit time allowable code amount to object VOP target code amount determining means other than object VOP target code amount determining means for each object other than the master object.

10. A moving image encoding device for encoding a plurality of objects, comprising:
master object determining means for determining an object to become a master by using input master object encoding information, input slave object first encoding information, and input priority information, and outputting master object information representing which object is a master;
switch control means for outputting a switch control signal as a signal that controls switches in accordance with the master object information;
input switch means for outputting first object data and second object data as master object data and slave object data, respectively, or outputting the first object data and the second object data as slave object data and master object data, respectively, in accordance with the switch control signal;
input storage means for temporarily storing the slave object data;
master object encoding means for encoding the master object data within a unit time allowable code amount representing an allowable code amount in a unit time to create and output a master object code sequence, and outputting the master object encoding information including at least one of quantization information, motion information, activity information, encoding error information, and object size information and a master object generated code amount;
code amount log storage means for storing the master object generated code amount;
remaining object allowable code amount calculating means for adding up the master object generated code amount output from said code amount log storage means within each time interval with the unit time length to obtain a sum value, and subtracting the sum value from the unit time allowable code amount, thereby calculating a remaining object unit time allowable code amount;
slave object encoding means for encoding each VOP of the slave object data output from said input storage means by performing encoding control in accordance with an input slave object VOP target code amount to create and output a slave object code sequence, and outputting slave object first encoding information including at least one of quantization information, motion information, activity information, encoding error information, and object size information, slave object second encoding information including at least one of quantization information, motion information, activity information, encoding error information, and a slave object generated code amount;
slave object VOP target code amount determining means for distributing the remaining object unit time allowable code amount to each VOP whose generation time is included in a time interval with the unit time length on the basis of the slave object second encoding information and the slave object generated code amount, and calculating the slave object VOP target code amount that is a target value of a code amount in encoding each VOP of the slave object;
output storage means for temporarily storing the master object code sequence; and
output switch means for outputting, in accordance with the switch information, the master object code sequence output from said output storage means and the salve object code sequence as a first object code sequence and a second object code sequence, respectively, or outputting the master object code sequence output from said output storage means and the salve object code sequence as a second object code sequence and a first object code sequence, respectively.

11. A device according to claim 10, further comprising remaining object allowable code amount distributing means for distributing the remaining object unit time allowable code amount to an object other than a master object and outputting the remaining object unit time allowable code amount to object VOP target code amount determining means other than object VOP target code amount determining means for each object other than the master object.

12. A recording medium storing a moving image encoding program for encoding a plurality of objects, the moving image encoding program comprising a program for executing the steps of:

encoding input first object data within a unit time allowable code amount representing an allowable code amount in a unit time to create and output a first object code sequence, and outputting a first object generated code amount;

storing the first object generated code amount;

adding up the first object generated code amount output from the storing step within each time interval with the unit time length to obtain a sum value, and subtracting the sum value from the unit time allowable code amount, thereby calculating a remaining object unit time allowable code amount;

encoding each VOP (Video Object Plane) of second object data by performing encoding control in accordance with an input second object VOP target code amount to create and output a second object code sequence, and outputting second object encoding information including at least one of quantization information, motion information, activity information, encoding error information, and object size information, and outputting a second object generated code amount; and distributing the remaining object unit time allowable code amount to each VOP whose generation time is included in a time interval with the unit time length on the basis of the second object encoding information and the second object generated code amount, and calculating the second object VOP target code amount that is a target value of a code amount in encoding each VOP of the second object.

* * * * *